(12) United States Patent
Kimura

(10) Patent No.: US 8,453,934 B2
(45) Date of Patent: Jun. 4, 2013

(54) LIGHT EMITTING DEVICE AND METHOD FOR TRACKING OBJECT

(75) Inventor: Akiteru Kimura, Chiyoda-ku (JP)

(73) Assignee: B-Core Inc., Tokyo (JP)

(*) Notice: Subject to any disclaimer, the term of this patent is extended or adjusted under 35 U.S.C. 154(b) by 177 days.

(21) Appl. No.: 13/028,662

(22) Filed: Feb. 16, 2011

(65) Prior Publication Data

US 2011/0150285 A1    Jun. 23, 2011

Related U.S. Application Data

(63) Continuation-in-part of application No. PCT/JP2009/064179, filed on Aug. 11, 2009.

(30) Foreign Application Priority Data

Aug. 21, 2008 (JP) ................................. 2008-212973

(51) Int. Cl.
    *G06K 13/00* (2006.01)
(52) U.S. Cl.
    USPC .......................................... 235/469; 235/376
(58) Field of Classification Search
    USPC ................... 235/469, 375, 376, 380
    See application file for complete search history.

(56) References Cited

U.S. PATENT DOCUMENTS

| | | | |
|---|---|---|---|
| 6,572,013 B2 * | 6/2003 | Katou et al. | 235/379 |
| 6,583,864 B1 * | 6/2003 | Stanners | 356/71 |
| 6,601,045 B1 * | 7/2003 | DePietro et al. | 705/43 |
| 7,131,576 B2 * | 11/2006 | Utz et al. | 235/379 |
| 2004/0002365 A1 | 1/2004 | Ota et al. | |
| 2009/0052902 A1 | 2/2009 | Shinokura | |

FOREIGN PATENT DOCUMENTS

| | | |
|---|---|---|
| JP | A-2001-189660 | 7/2001 |
| JP | A-2001-208511 | 8/2001 |
| JP | A-2004-32529 | 1/2004 |
| JP | A-2004-56343 | 2/2004 |
| JP | A-2004-226227 | 8/2004 |
| JP | A-2005-136665 | 5/2005 |
| JP | A-2008-27036 | 2/2008 |
| WO | WO 2006/109829 A1 | 10/2006 |

OTHER PUBLICATIONS

International Search Report issued in International Application No. PCT/JP2009/064179 on Oct. 27, 2009 (with translation).

* cited by examiner

*Primary Examiner* — Daniel St Cyr
(74) *Attorney, Agent, or Firm* — Oliff & Berridge, PLC

(57) ABSTRACT

A technique and a light emitting device that can smoothly read out data while tracking a position of the light emitting device (an object). The light emitting device expresses data with "a change in the change of a color (switching of changes) ". The light emitting device specifies an object and the position thereof with a first primary change and thereafter expresses data with, so to speak, a secondary change (switching of the primary change). The primary change means that G and B alternately turn on (indicated by G*B) and so on. The secondary change means a change from the condition (G*B), in which G and B alternately turn on, to the condition (B*R) in which B and R alternately turn on. Thus, since data is expressed by the change of color condition changes, it is easier to freely express data while the position of an object is specified.

4 Claims, 16 Drawing Sheets

LIGHT EMITTING DEVICE AND METHOD FOR TRACKING OBJECT

TECHNICAL FIELD

The present invention relates to a light emitting device, a color change of light emitted from which changes depending on data and particularly to a light emitting device which represents data by a change of a color change. Typically, this light emitting device is attached to an object and used for tracking the object and displaying and communicating predetermined data.

BACKGROUND ART

Data Communication Using Light

Remote communication units using light have been conventionally known. A conventional communication unit using light generally encodes data using a combination of time durations of light intensity (flashing, blinking, etc.) and transmits it.

The present inventors uniquely developed an invention of encoding data using a color change (hue change, color phase change) instead of flashing or blinking and already filed a separate patent application.

Particularly, the present inventors are inventing a mechanism capable of transmitting the position of a light emitter while displaying data using the light emitter, the color of which changes in a specific pattern.

Tracking of Shape and Color

As described above, the present inventors are proposing a technology for representing data by a color change and indicating a position by the color change.

For the detection of the indicated position, there is used a technology for extracting and selecting a definite shape or a color change from a still image by an image processing technology. In the case of a moving light emitter, there is used a technology for tracking a definite shape or a color change from moving images.

Particularly, in the case of moving images, the light emitter is tracked by taking differences between respective still images constituting the moving images or extracting a color distribution characteristic.

Problems

However, there are the following problems to be overcome.

(1) To represent information, flashing and a color change need to be able to follow various patterns. To represent various data, flashing and the color change also need to change in various patterns.

(2) On the other hand, to detect the position of a light emitter, features of images used for a tracking technology need to be fixed. In other words, an object to be tracked generally needs to be in a fixed pattern.

As described above, the representation of various data and the detection of positions are generally contradicting events, and a technology for enabling tracking, specifying positions in images and analyzing data represented by its light emission pattern using only light images has been little known thus far.

For example, for the indication of a position, data representing the position needs to be a fixed given value to specify the position.

If the fixed value can be set, it is also possible to use a static optical automatic recognition code such as a bar-code symbol. In other words, each still image in moving images is extracted, a bar-code pattern is searched, analyzed and decoded for each still image to obtain raw data. With a technology capable of static analysis, even moving images can be complemented, with the result that raw data is analyzed (decoded) while the position is being detected by tracking.

Tracking on moving images is thought to be possible if a simple static pattern like a classic bar-code is used and representing data is fixed as described above.

On the other hand, a technology capable of tracking a pattern changing in a complicated manner on moving images is unknown. If it is ever tried to represent different types of data, a color pattern changes in a complicated manner, wherefore it is thought to be difficult in principle to track such a pattern.

If not a special camera, but a common general digital video camera generally used at present is used, this technology is thought to be widely usable for more general applications. Accordingly, we want to assume the use of a general video camera.

Under this assumption, at most moving images of about 30 fps can be obtained.

If it is possible to construct a system capable of data communication and position specification on the assumption of moving images of such quality, it goes without saying that a system having a high degree of convenience can be provided and applied for a variety of purposes.

The present invention was developed against such a background and one object thereof is to provide a system capable of tracking an object while realizing a practical data transfer amount.

Optical Automatic Recognition Code

Mechanisms which simply try to represent fixed data without considering a position have been conventionally widely known, and one of them is an optical automatic recognition code such as a bar-code. There are numerous purposes for attaching predetermined data such as an. ID to a good (called an object to be printed). Classically, the above optical automatic recognition codes such as bar-codes have been widely used.

In recent years, RFID using electromagnetic waves and the like have been also utilized. A predetermined mark is optically read from an optical recognition code to obtain raw data, and data can be read if the code is present in a visible range. Further, raw data is read from an RFID using electromagnetic waves and the RFID has a feature of being readable even if it is visually hidden.

A point-of-sale (POS) system used, for example, in stores and the like generally uses optical automatic recognition codes for goods. Bar-codes described above and color bar-codes are used as the optical automatic recognition codes. A bar-code is a two-color code composed of white bars and black bars. Various optical recognition codes utilizing many colors (red, blue, yellow, etc.) including chromatic colors have been and are being proposed.

The inventors of the present invention also proposed a color bar-code called a "1D color bit code" in patent applications (Japanese Patent Application 2006-196705, etc.).

Terms

An optical recognition code including chromatic colors is called a "color bar-code" for the sake of convenience. Further, if a code is simply called a "bar-code", it means a classic bar-code composed of white bars and black bars.

An optical recognition code is generally attached to an object or its container or package in many cases. This act of attachment is called "marking".

A body or means which embodies a mark by marking is generally called a "medium". For example, "ink" used at the time of marking an optical recognition code on an object is a preferable example of a medium. If an object is an article of clothing or the like, a "tag" or the like made of thick paper is used and an optical recognition code such as a bar-code is attached to this tag in many cases. In such a case, the "tag" is a preferable example of a medium. An object may be particularly called an "object to be printed". Particularly, this derives from the fact that objects were often recognized as "objects to be printed with bar-codes" (=objects to be printed) since bar-codes have been conventionally marked by printing in many cases.

Example Other than light

Although an optical recognition code represents data using "light", means for representing data using another physical means are also known.

For example, automatic recognition means using radio waves such as the RFID described above has been developed and put to practical use. Non-contact IC card tickets of railways and the like are known as examples using this RFID.

Communication Examples

A field of a data "communication" technology exists as a technology relating to a technology for "displaying" data. In light of this data communication technology, many examples using other physical means are known.

For example, optical communication using optical fibers is known as a means using light similar to optical recognition codes. Although it is simply said to use "light", there are known communication means using various lights such as infrared light, laser light and visible light as intermediaries.

Position Tracking

It has been conventionally known to use an optical recognition code not only for the purpose of "displaying" data, but also for the purpose of tracking the "position" of an object.

Such a purpose includes a position measurement/data communication system using infrared light as an intermediary, for example, as disclosed in the following prior art documents (patent documents 1, 2).

Prior Art Documents

Patent document 1 below discloses a position measurement/data communication system which includes a light emitting member for position display and a light emitting member for data transmission, photographs light emitting states of the members by an image pickup unit, measures a position based on the photographed images and conducts data communication by blinking the light emitting members.

Patent document 2 below discloses a position detection system which includes a marker and an individual identification code output unit, transmits an individual identification code by infrared light, electromagnetic waves or the like and changes the luminance/color phase of the marker in a predetermined pattern simultaneously with the transmission of this individual identification code, thereby determining the position of an individual object simultaneously with reception of the individual identification code.

Patent Document 1:

Japanese Unexamined Patent Publication No. 2001-208511

Patent Document 2:

Japanese Unexamined Patent Publication No. 2004-226227

SUMMARY OF INVENTION

Technical Problem

As described thus far, one object of the present invention is to realize an apparatus capable of:

(1) easily optically specifying the position of an object, and
(2) reliably communicating data, using a common CCD camera or video camera.

To realize this method, the present invention aims to realize the above object by focusing on a "color change" and elaborating this. Particularly, the present invention aims to provide a technology capable of smoothly specifying a position and representing data using a change of a color change (particularly means a switch of a color change in embodiments described later).

Color Changing Technology

A LED capable of changing the color of emitted light is generally well-known and called a full-color LED or the like. It is easy to change the color of such a full-color LED, visually obtain the changed color by a CCD camera and produce this on a monitor.

Tracking Technology

A technology for tracking the same color and the one for tracking a moving body in images based on differences between the images are widely known and have become common.

Accordingly, it is generally possible to track the LED of the same color (fixed color) using such a tracking technology.

However, in the case of representing data by changing the color of the LED, such a conventionally known tracking technology is thought to be unusable in many cases.

Further, the use of a technology for tracking a body using the shape of the body as a feature is often very difficult particularly when a light emitter as this body is supposed to be distant. Even if such a use is forced, it necessitates a high-precision arithmetic processing and a calculation amount becomes enormous, wherefore it is expected to be impossible to use this technology.

The above LED is not necessarily constantly captured by a CCD camera for a certain reason and, in addition, it is generally considered that equivalent colors are present in the surrounding.

Thus, if the conventional technology that tracks an object based on color is used as it is, it is thought to be difficult to track an object whose color changes.

Accordingly, thinking it appropriate to track not a single color, but a "color change", the present invention was completed.

Basic Concept

An easiest idea of following a color change is to find out a color changing part by taking differences between frames. However, as described above, full-color LED light is not necessarily constantly complemented. Since one color "change" is directly linked to data it tries to represent, it is difficult to reproduce the data if the change is missed. In other words, a probability of reproducing complete data decreases.

Further, it is supposed that there are many parts which indicate a similar color change other than by this full-color LED due to a relationship between a background and a beam and the like. In such a case, they might be possibly erroneously tracked.

Principle of the Present Invention (a Change of a Change) (May be also Called a Switch of a Change)

Accordingly, to solve the above problems, the present invention was designed to realize a technology for representing data using a "change of a color change" of an LED or the like whose color is changed.

Its concept is described below.

First, FIG. 1 is a sequence diagram showing a sequence of turning LEDs of three colors on and off, wherein a horizontal axis represents time. The following description is made, assuming that these LEDs of three RGB colors constitute a full-color LED. The full-color LED is an LED device capable of emitting light of an arbitrary color by appropriately turning these LEDs of three colors on and off.

Here, to facilitate the description, a case is described where light of only one color is simultaneously emitted. In other words, there are thought only the case of emitting R light, the case of emitting B light, and the case of emitting G light, i.e. only the respective cases of emitting lights of the respective three colors.

First, a notation system is defined.

R*G denotes a case where R and G LEDs are alternately and repeatedly turned on and off, i.e. a case where R on→G on (R off)→R on (G off)→G on (R off)→R on (G off) repeats. Similarly, G*B denotes a case where G and B LEDs are alternately and repeatedly turned on and off. Similarly, B*R denotes a case where B and R LEDs are alternately and repeatedly turned on and off.

In an example shown in FIG. 1, changes of the LEDs change in R*G→G*B→B*R→R*G→B*R→R*G.

In other words, a feature of the present invention is to represent data by "changing" the "changing state" of the colors.

Note that this "change of a color change" is called a "switch of a color change" for the sake of convenience to make expression more easily understandable, but this term actually means the same as the "change of the change". Particularly in the embodiments to be described later, a pattern of cyclically changing specified colors is described as a color change. A change of the color used and the like is a "change of a change". Since a color light emission pattern changes in this case, it is also called a "switch of a light emission pattern" in some cases.

For example, data "0", "1" are allotted as follows.

Data "1" is allotted to R*G→G*B, G*B→B*R, B*R→R*G. In the case of such switches of color changing states, they represent "1".

Further, data "0" is allotted to G*B→R*G, B*R→G*B, R*G→B*R. In the case of such switches of color changing states, they represent "1".

If the data are allotted to the switches of the respective color changes in this way, the pattern shown in FIG. 1 represents data 1, 1, 1, 0, 1.

Since data is represented by a change of a color change (a switch of a color change) in the present invention in this way, an object and its position are specified by a first-order change and then data is represented by a second-order change (a switch of the first-order change).

Accordingly, it becomes possible to freely represent data while specifying the position of an object.

Concerning a Cycle

The principle of the present invention is to switch a cyclic change of color. This cycle represents a unit period of changing colors and may be any arbitrary time. However, in consideration of photographing using a common and inexpensive video camera of about 30 fps and other factors, the unit period is preferably longer than a frame period of an image of this video camera. On the other hand, since a data rate decreases if the unit time is too long, a cycle suitable for the purpose should be selected.

Since color cyclically changes in the present invention, so-called "continuous" light emission appears to be a useful effect. Since the light emission is "continuous", it is possible to reduce a possibility of missing an object upon chasing and tracking the object and construct a system having a high degree of convenience.

Although it depends on an implementation method, an object can be efficiently chased and tracked in many cases if a continuously interrupted period is suppressed to at most two cycles.

Although the case where only the LED of one color emits light at one time is described here to facilitate understanding, it is, of course, generally all right to permit two or more LEDs to emit light, which enables more types of data to be represented.

Preliminary Technical Plans before Reaching the Present Invention

The present inventors studied possibilities of various data display methods by light emission. Several of such examples are described, compared and considered below.

Technical Plan 1: "Color Value Data Method" (Color Type=DATA)

This is a method for directly allotting data to respective colors in a simplest manner. For example, data are allotted as follows:

R: 0, G: 1, B: 2.

An example when data are allotted to the colors themselves in this way is shown in FIG. 2. As in FIG. 1, the example shown in FIG. 2 is a sequence diagram of light emissions of LEDs of the respective RGB colors, wherein a horizontal axis represents time. Similar to the example described above, an example where light of at most one color is emitted is shown here to facilitate understanding.

Note that plans of technology the present inventors uniquely created themselves are called technical plans. These technical plans are not prior art.

Feature of Technical Plan I:

It is assumed that a color corresponding to each data has a large range in a color space. (This holds also for the following considerations.) A problem of this method is that, in order to indicate a continuation of data, e.g. 1, 1, 1, 1, continuous emission of the same color, i.e. G, G, G, G is necessary. If the light of the same color continues, it needs to be read by being divided by a time component (synchronization timing). Thus, accuracy of a reading timing (synchronization timing) becomes important.

If the time of the same color becomes longer, it results in the following drawbacks.

There is a risk of increasing an error of the synchronization timing.

There is a risk of erroneously recognizing the color if the color changes due to outside light, a reader and other factors since a relative comparison with other "data constituent colors" (R, G, B in this case) cannot be made.

Let us further study a process for specifying a "signal light emitter" (light emitter emitting this signal pattern) on a captured screen.

Since it is assumed that the colors themselves have large permissible ranges as described above, it is difficult to specify the signal light emitter by the colors.

FIGS. 3 and 4 show an example where five bright spots are present (at fixed positions). In this example, colors emitted from the five bright spots respectively change. In FIGS. 3 and 4, time elapses from top to bottom, and a continuation of FIG. 3 is shown in FIG. 4. Screens along the flow of time are shown in a line (a) of FIG. 3 and a line (a) of FIG. 4 as a continuation. Difference images of these respective images are shown in a line (b) of FIG. 3 and a line (b) of FIG. 4.

The line (a) of FIG. 3 is described assuming a standard background. Accordingly, a case is supposed where many other "light emitters" of similar colors or many background patterns of similar colors are present.

Thus, all signal light emitters are tracked so that any of them can be regarded as a "candidate" for an object "signal light emitter". According to the example shown in FIGS. 3 and 4, a process proceeds regarding all the five light emitters as candidates, with the result that there is a possibility of making the process cumbersome.

On the other hand, a color change may also be possibly tracked based on differences between frame images. However, as described above, there are cases where the same color continuously appears and color becomes unstable before and after a change, wherefore it is not always possible to constantly chase and follow changes. For example, times of color changes in FIG. 2 are called "indefinite". Difference images in the case of using these indefinite images often become also indefinite and, hence, there are cases where tracking is difficult even if difference images are used.

The example of FIGS. 3 and 4 is described.

First, an example where four bright spots are present in addition to a target bright spot of the color R is shown in (a)–1 of FIG. 3. This example of FIGS. 3 and 4 shows a case where the bright spots are static (a case where the bright spots are movable is described later).

In (a)–1 of FIG. 3, the four bright spots are present in addition to the target bright spot, i.e. a total of five bright spots are present on the screen. For example, the lower-left bright spot is a blinking bright spot of R light similar to the target bright spot. In other words, this bright spot is on in (a)–1, (a)–3 and (a)–5, whereas it is off in (a)–2, (a)–4 and (a)–6. In FIGS. 3 and 4, ○ denotes a state where the bright spot is on and superimposition of × on ○ denotes a state where the bright spot is off.

A case where the brightness of the target bright spot decreases for a certain reason and the target bright spot is turned off is shown in (a)–2 of FIG. 3. In this case, two bright spots of color –R appear in a difference image (b)–1 between (a)–2 and (a)–1 (see (b)–1 of FIG. 3). One of these bright spots is the target bright spot as described above, and the other thereof is the lower-left blinking bright spot described above.

In (a)–3 of FIG. 3, the brightness of the target bright spot returns and the target bright spot emits R light again. Further, the aforementioned lower-left blinking bright spot described above becomes brighter again by blinking and emit R light. In this case, two bright spots of color +R appear in a difference image (b)–2 between (a)–3 and (a)–2 (see (b)–2 of FIG. 3). Similarly, one of these bright spots is the target bright spot, and the other thereof is the lower-left blinking bright spot.

The continuation of FIG. 3 is shown in FIG. 4.

In (a)–4 of FIG. 4 as a continuation of (a)–3 of FIG. 3, the color of the target bright spot (target pixel (s)) is changed to G (green). Further, the left-lower blinking bright spot is in an off state. In this state, the target pixel is G–R and the lower-left blinking bright spot is –R in a difference image (b)–3 (shown in both FIGS. 3 and 4) between (a)–4 and (a)–3.

Subsequently, in (a)–5 of FIG. 4, the target pixel remains to emit G (green) light and the lower-left blinking bright spot is changed from the off state to an on state. In this state, the target pixel disappears in a difference image (b)–4 (FIG. 4) between (a)–5 and (a)–4 since having the same color. On the other hand, the lower-left blinking bright spot becomes +R.

In the case of using the difference images in this way, the bright spot cannot be detected when it continues to emit light and can be detected only when the color thereof changes.

Subsequently, in (a)–6 of FIG. 4, the color of the target pixel changes to B (blue) and the lower-left blinking bright spot is changed from the on state to the off state. In this state, the target pixel is B–G and, on the other hand, the lower-left blinking bright spot is –R in a difference image (b)–5 (FIG. 4) between (a)–6 and (a)–5.

In the case of using the difference images in this way, difference images can be extracted only when there is a color change.

Further, if a color change accidentally occurs in another part (background) of an image, it is difficult to distinguish this background and a light emitter desired to be detected.

Further, when a "signal light emitter" moves as shown in FIGS. 5 and 6 to be described next, a target light emitter can be, in principle, detected using difference images, but a specifying process is cumbersome since light emitters other than the target light emitter are similarly detected.

FIGS. 5 and 6 show a case where a plurality of bright spots are included in one image as in FIGS. 3 and 4. Particularly, FIGS. 5 and 6 show a state where the bright spots move.

First, in (a)–1 of FIG. 5, two bright spots other than a target bright spot (upper-left bright spot) are present, i.e. a total of three bright spots are present on a screen. For example, the lower-right bright spot is a blinking bright spot of color G. The bright spot at the right end is a bright spot of color B and neither blinks nor undergoes a color change. An example shown in FIGS. 5 and 6 relates to a case where all the bright spots including the target bright spot move.

The blinking lower-right bright spot is on in (a)–1, (a)–3, (a)–5 and (a)–7 and off in (a)–2, (a)–4, (a)–6 and (a)–8. As in FIGS. 3 and 4, ○ denotes a state where the bright spot is on and superimposition of × on ○ denotes a state where the bright spot is off.

A case where the brightness of the target bright spot decreases for a certain reason and the target bright spot is turned off is shown in (a)–2 of FIG. 5. In (a)–2, the lower-right bright spot is off as described above. In this case, a bright spot of a difference between +B and –b appears at the right end in a difference image (b)–1 between (a)–2 and (a)–1. This is because the bright spot of B moved between (a)–1 and (a)–2. A difference of –b appears at a position before a movement and a difference of +B appears at a position after the movement.

Since the bright spot of R at the left end and the lower-right bright spot of G have disappeared (off) in (a)–2 as compared with (a)–1, differences of –R, –G respectively appear in a difference image (b)–1.

In (a)–3 of FIG. 5, the brightness of the target bright spot returns and the target bright spot emits R light again. Further, the aforementioned lower-left blinking bright spot described above becomes brighter again by blinking and emit G light. In this case, a bright spot of a difference between +B and –b first appears at the right end in a difference image (b)–2 between (a)–3 and (a)–2. This is because the bright spot of B further moved between (a)–2 and (a)–3. A difference of –b appears at a position before a movement and a difference of +B appears at a position after the movement. This is similar to the difference image (b)–2.

Since the bright spot of R at the left end and the lower-right bright spot of G appear again in (a)–3 as compared with (a)–2, bright spots of differences of +R, +G respectively appear in the difference image (b)–2.

In (a)–4 of FIG. 5, the color of the target bright spot has changed and emits G light anew. Further, the aforementioned lower-left blinking bright spot becomes darker by blinking and disappears. In this case, the bright spot of the difference between +B and –b appears at the right end as thus far in a difference image (b)–3 between (a)–4 and (a)–3. This is because the bright spot of B further moved between (a)–3 and (a)–4. A difference of –b appears at a position before a movement and a difference of +B appears at a position after the movement. This is similar to the difference images (b)–2 and (b)–3.

Further, in (a)–4, the bright spot at the left end undergoes a color change to G while moving as compared with (a)–3. Thus, bright spots of differences +G, –R respectively appear in the difference image (b)-3. The bright spot of the difference −R appears at the position where the bright spot of R was present, and the bright spot of the difference +G appears at the position where G light is presently emitted anew.

The continuation of FIG. 5 is shown in FIG. 6.

In (a)-5 of FIG. 6 as a continuation of (a)-4 of FIG. 5, the target bright spot (target pixel(s)) continues to emit G light. Further, the lower-left blinking bright spot is in an on state (G) this time. Note that (a)-4, (b)-4 of FIG. 5 are shown again in FIG. 6.

In this state, bright spots of differences +B, −b appear at the right end as thus far in a difference image (b)-4 (shown in both FIGS. 5 and 6) between (a)-5 and (a)-4. This is because the bright spot of B further moved between (a)-4 and (a)-5. The difference −b appears at a position before a movement and the difference +B appears at a position after the movement. This is similar to the difference images (b)-2 and (b)-3.

Further, the bright spot at the left end has moved between (a)-4 and (a)-5. Thus, bright spots of differences +G, −G respectively appear in the difference image (b)-4. The bright spot of −G appears at the position before the movement and the bright spot of +G appears at the position after the movement.

Since the lower bright spot of G is in an on state again as described above in (a)-5, the bright spot of +G appears in the difference image (b)-4.

In (a)-6 of FIG. 6, the target pixel continues to emit G light. Further, the lower-left blinking bright spot is in an off state this time.

In this state, the bright spots of the differences +B, −B appear at the right end as thus far in a difference image (b)-5 between (a)-6 and (a)-5. Further, the bright spot at the left end moved between (a)-5 and (a)-6. Thus, the bright spots of the differences +G, −G respectively appear as thus far in the difference image (b)-5. Since the lower bright spot of G is in the off state in (a)-6 as described above, a bright spot of −G appears in the difference image (b)-5.

Also in (a)-7 of FIG. 6, the target pixel continues to emit G light. Further, the lower-left blinking bright spot is in an on state this time.

In this state, the bright spots of the differences +B, −B appear at the right end as thus far in a difference image (b)-6 between (a)-7 and (a)-6. Similarly, the bright spots of the differences +G, −G appear at the left end. Since the lower bright spot of G is in the on state in (a)-7 as described above, a bright spot of +G appears in the difference image (b)-6.

In (a)-8 of FIG. 6, the target pixel has undergone a color change from G to B and emits B light. Further, the lower-left blinking bright spot is in an off state this time. In this state, bright spots of +B and −G appear at the left end of a difference image (b)-7 between (a)-8 and (a)-7. A bright spot of +B appears at a position where the color has changed and B light is emitted at present; and a bright spot of −G appears at a middle position in (a)-7 before the change. Further, the bright spots of the differences +B, −B appear at the right end as thus far. Since the lower bright spot of G is in the off state in (a)-8 as described above, a bright spot of −G appears at the bottom in the difference image (b)-7.

Technical Plan 2

Next, there is described an example where values are allotted to color changes.

There is described a case where:

R*G:0, B*R:1 and G*B:2.

Specifically, when color changes (cyclically changes) between R and G as in R-G-R-G-R-G-. . . , "0" is allotted. Similarly, "1" is allotted to a change between B and R and "2" is allotted to a change between G and B. In other words, data are represented in ternary notation.

A light emission example in such a case is shown in FIG. 7.

In FIG. 7 is shown a sequence of emission of respective RGB lights as in FIG. 2 and other figures, wherein light of any one of RGB is emitted at one time. In this light emission sequence, the colors of the emitted lights are detected by sampling during a sampling period indicated by chain double-dashed lines in FIG. 7. The detected colors are shown in a row below a row shown by chain double-dashed lines. Values of data obtained as a result of this detection are shown in the bottommost row of FIG. 7.

If a continuation of data 1, 1, 1, 1 is assumed as thus far under such a method, it represents R*B, R*B, R*B, R*B and alternate on states of R and B successively occur. Thus, in the case of reading the data, the data needs to be read by dividing successive alternate on-periods of the same two colors along a time axis. In other words, the data is read by being divided by a time component (synchronization timing).

In the example shown in FIG. 7, continuous data of 0, 1, 1, 1, 2, 0 is shown. If a period of the alternate on state (R*B, R*B, R*B in the example of FIG. 7) of the same colors becomes longer, the following problems arise.

There is a risk of increasing a synchronization timing error. In other words, how many times the same data has continued is detected by detecting how many times the same colors have been successively repeated based on a predetermined color repeating cycle. If the same data continues many times, timing errors may be accumulated to possibly cause a reading error.

Although it shows the alternate on states (e.g. R*B), a relative comparison with the remaining one color (e.g. G) cannot be made. Thus, there is a risk of erroneously recognizing color when color changes due to outside light, a reader and other factors.

For example, if R*G continues, a distinction from R*B becomes unclear when G approaches a threshold value to B. In reality, R and G do not necessarily exactly switch in a moment in light emission, leaving an interval of 0 therebetween, and an intermediate color between them may be mixed. When viewed from a capturing side (reading side), it is, in principle, difficult to avoid a different color from being mixed with the detected color when a signal color changes during an exposure period. Due to the mixture of the color of a background or the like, the prolonged alternate on states of the same colors are not necessarily constantly read as the same data.

Thinking a specific image processing of a signal light emitter on a captured (picked up and read by a computer or the like) screen, color changes can be constantly recognized. This is because a sampling period is so determined that a period of a color changing cycle is at least twice as long as the sampling period. Thus, the signal light emitter can be specified utilizing a detected color change. In other words, it becomes clear that the signal light emitter is present at this position and cyclically changes its color.

However, in a case of repeating the same change for a long time, if there is accidentally a light emitter (e.g. blinking of a signal) which repeats a similar change or a change analogues thereto, the above reading error (instability) of the captured color of the light emitter (influence of a state of surrounding outside light, color tones of objects located in the surrounding, etc.) may be considered to distinguish this "false" light emitter from the true "light emitter". However, this may make a process for specifying the "true" "signal light emitter" cumbersome.

As described above, it is desirable in this method to determine how many times successive alternate light emission is allowed to be repeated for one data. For example, in the example of FIG. 7, such light emission is allowed to be repeated twice. In other words, if it is assumed that repetition of two alternate light emissions represents one data, a case of repeating alternate light emission four times is judged to be such that the same data successively continue.

As is clear from FIG. 7, generally, the color that is not used in the next repeated light emission may come at the end of the repeated light emission. For example, in FIG. 7, when the data changes from "0" to "1", the light emission successively changes in "R-G-R-G-B-R-B-R". This means a change R*G→B*R.

What should be noted is that it looks as if G*B would exist in a moment between the repetition of R*G and that of B*R (in a boundary part). This may possibly cause a reading error.
Prior Art 3

It is thought to express values by color changing directions.

For example, values are determined by the changing directions as follows:

R→G, G→B, B→R: 1 and
G→R, B→G, R→B: 0.

A state of a case where the data is represented by the color changing directions in this way is shown in FIG. 8.

In this case, if a light emission period of the same color is short (if color continues to change within a short time), it becomes difficult in many cases to reliably detect a change in consideration of the instability of the color of the captured image as described above. Apparently, this becomes more difficult as the light emission time of the same color becomes shorter.

For example, in a case where R, G repeatedly appears in R→G→R→G, there is a possibility that problems similar to those mentioned under the caption "Technical plan 2" arise.

In other words, there is a risk of increasing the synchronization timing error and a relative comparison with the remaining one color cannot be made. Therefore, it becomes impossible to regularly perform a calibration and there is a possibility of an error in color reading.

On the other hand, when one color is kept for a relatively long time as in FIG. 6, problems similar to those of "Technical plan 1" arise.

Means for Solving the Problems

Specifically, the present invention employs the following means.

(1) The present invention is directed to a light emitting device, comprising a light emitter capable of emitting lights of at least three colors; and a control unit for cyclically changing the color of the light emitted by the light emitter, wherein the control unit switches the cyclic color change based on predetermined data and represents the predetermined data by the switching of the cyclic color change.

(2) In the light emitting device according to (1), the color change is the one obtained by alternately emitting lights of two different colors, and the switching is to change at least one of the colors of the alternately emitted lights to another color.

(3) The present invention is also directed to a light emitting device, comprising a first light emitter and a second light emitter capable of emitting lights of at least three colors; and a control unit for cyclically changing the colors of the lights emitted by the first and second light emitters, wherein the control unit switches the cyclic color changes based on predetermined data, represents the predetermined data by the switching of the cyclic color changes, and controls so that the cyclic color change of the first light emitter and that of the second light emitter are different color changes.

(4) In the light emitting device according to (3), the color change is the one obtained by alternately emitting lights of two different colors, and the switching is to change at least one of the colors of the alternately emitted lights to another color.

(5) In the light emitting device according to (4), the different color changes include those in which at least either one of the colors of the alternately emitted lights differs.

(6) In the light emitting device according to (4), at least one of the colors of the alternately emitted lights differs in the different color changes, and the control unit controls so that the first and second light emitters do not simultaneously emit the same color of light.

(7) In the light emitting device according to (4), the different color changes include those in which the colors of the alternately emitted lights are same, but emission timings differ, and the control unit controls so that the first and second light emitters do not simultaneously emit the same color of light.

(8) In order to solve the above problems, the present invention is also directed to a light emitting device, comprising n first to $n^{th}$ light emitters capable of emitting lights of at least three colors; and a control unit for respectively cyclically changing the colors of the lights emitted by the first to $n^{th}$ light emitters, wherein the control unit switches the cyclic color changes based on predetermined data, represents the predetermined data by the switching of the cyclic color changes, and controls so that the cyclic color changes of the first to $n^{th}$ light emitters differ from each other.

(9) In the light emitting device according to (8), the color change is the one obtained by alternately emitting lights of two different colors, and the switching is to change at least one of the colors of the alternately emitted lights to another color.

(10) In the light emitting device according to (9), the different color changes include both (a) different color changes in which at least one of the colors of the alternately emitted lights is different and (b) different color changes in which the colors of the alternately emitted lights are same, but emission timings differ.

(11) In order to solve the above problems, the present invention is also directed to a light emitting device, comprising m first to $m^{th}$ light emitters capable of emitting lights of at least three colors; and a control unit for respectively cyclically changing the colors of the lights emitted by the first to $m^{th}$ light emitters, wherein the control unit switches the cyclic color changes based on a predetermined ID, represents an ID of the light emitting device or an ID of an object having the light emitting device attached thereto by the switching of the cyclic color changes, switches the cyclic color changes based on predetermined data, and represents the predetermined data by the switching of the cyclic color changes. Here, m is a positive integer equal to or bigger than 1.

(12) In the light emitting device according to (11), a frame as a communication unit includes an ID pattern composed of a group of color changes switched to represent the ID, a data pattern composed of a group of color changes switched to represent the data and a margin pattern meaning a margin representing neither the ID nor the data, and the control unit controls the light emitters so as to display and transmit data by the frame.

(13) In the light emitting device according to (12), the margin pattern is such that a predetermined first color change and a second color change different from the first color change are alternately switched and repeated.

(14) In the light emitting device according to (12) or (13), a delimiter module as a predetermined color change is arranged to represent a delimiter between the ID pattern composed of the group of color changes switched to represent the ID, the data pattern composed of the group of color changes switched to represent the data and the margin pattern meaning the margin representing neither the ID nor the data.

(15) In the light emitting device according to (14), the delimiter module is a color change obtained by alternately emitting lights having a predetermined first color and a second color different from the first color.

(16) In the light emitting device according to any one of (12) to (15), the control unit causes the light emitters to continuously emit light at least in two cycles.

(17) In the light emitting device according to any one of (1) to (15), the control unit controls the light emitter so that a continuous off period of the light emitter is at most two cycles.

(18) The present invention is also directed to a light emitting device, comprising a light emitter capable of emitting lights of at least three colors; and a control unit for cyclically changing an emission intensity of the light emitter, wherein the control unit switches the color of the cyclic emission intensity change based on predetermined data and represents the predetermined data by the switching of the color.

(19) In the light emitting device according to (18), at the time of the cyclic emission intensity change, emission intensities detected at respective intensity detection timings during a cycle all differ at the respective timings.

(20) In order to solve the above problems, the present invention is also directed to an object tracking method for attaching a light emitting device for representing data representing an object by changing the color of emitted light with time to the object, recognizing the, object and tracking the position of the object by recognizing the color of the light emitted by the light emitting device, comprising a recognition step of recognizing the object by photographing an image including the light emitting device, recognizing the color of the light emitted by the light emitting device from the image and restoring the data, and specifying the position of the object based on the position of the recognized color; a tracking step of photographing images including the light emitting device, recognizing a change of the color of the light emitted by the light emitting device from the images, and tracking the position of the object based on the position of the color change; and a step of recognizing the object by performing the recognition step once, storing the recognized object in a predetermined storage together with the position of the object, thereafter repeatedly performing only the tracking step, and storing the position of the color change obtained in each tracking step as the position of the object in the storage.

(21) In the object tracking method according to (20), the light emitting device is the one according to any one of (1) to (19).

(22) In the object tracking method according to (20), the light emitting device is the one which represents data by a color change.

(23) In the object tracking method according to any one of (20) to (22), further comprising a step of, when the object cannot be recognized even if the recognition step is performed once, storing the position of the color change in a predetermined storage, thereafter, repeatedly performing only the tracking step, and storing the position of the color change obtained in each tracking step as the position of the unrecognized object in the storage.

(24) In the object tracking method according to (23), further comprising a step of allotting provisional data to the unrecognized object and storing the position of the color change obtained in each tracking step as the position of the object recognized by the provisional data in the storage.

(25) In the object tracking method according to (24), further comprising a step of performing the recognition step for the object recognized by the provisional data and replacing the provisional data by normally read data when the data can be normally read and the object thereof can be recognized.

(26) In the object tracking method according to any one of (20) to (25), further comprising a step of displaying data read for each object and the position of the each object while relating them to each other.

Advantageous Effects of Invention

As described above, since data is represented by being allotted to a switch of a color change (a change of a color change) according to the present invention, it is possible to track the position of (an object attached with) a light emitting device and read data.

Further, since recognition of an object and tracking thereof are separately performed according to the present invention, even a device with a low processing power can recognize and track the object.

BRIEF DESCRIPTION OF DRAWINGS

FIG. 11 is a diagram showing a state of color changes in the case of using a plurality of light emitters (embodiment 2), FIG. 12 is a diagram showing a state of color changes in the case of permitting simultaneous light emission of the same color (modification 1 of the embodiment 2), FIG. 13 is a diagram showing a state of color changes in the case of permitting simultaneous light emission of the same color (modification 1 of the embodiment 2), FIG. 14 is a diagram showing a state of color changes in the case of permitting simultaneous light emission of the same color (modification 1 of the embodiment 2)

REFERENCE SIGNS LIST

100 control unit
102 computer
104 memory
200 light emitter

DESCRIPTION OF EMBODIMENTS

Hereinafter, embodiments developed to solve the above problems are described with reference to the drawings.
Embodiment 1: Basic Mode The principle of the present invention is to represent data by a "change" of a "color change" and most basic/preferable embodiments thereof are described with reference to the drawings.

Figure 1:
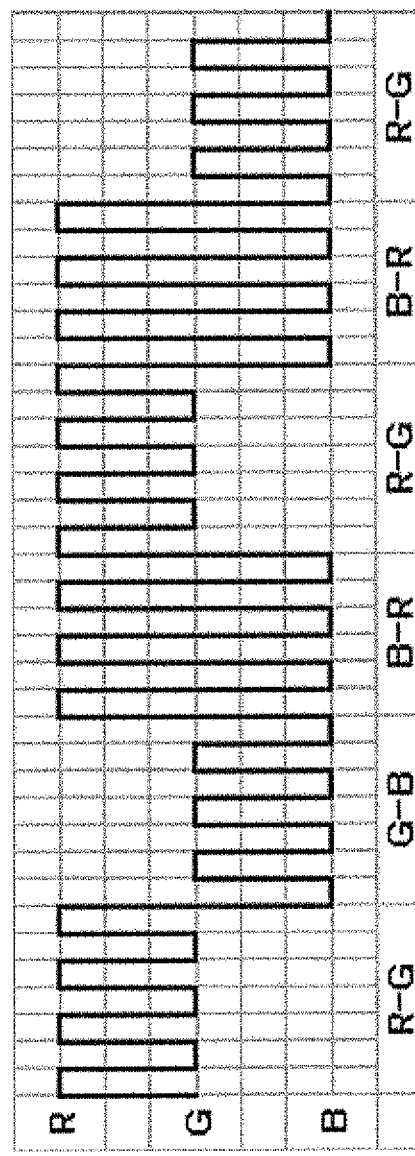
FIG. 1 is a sequence diagram showing a sequence of turning on and off LEDs of three colors with a horizontal axis representing time.
Figure 2:
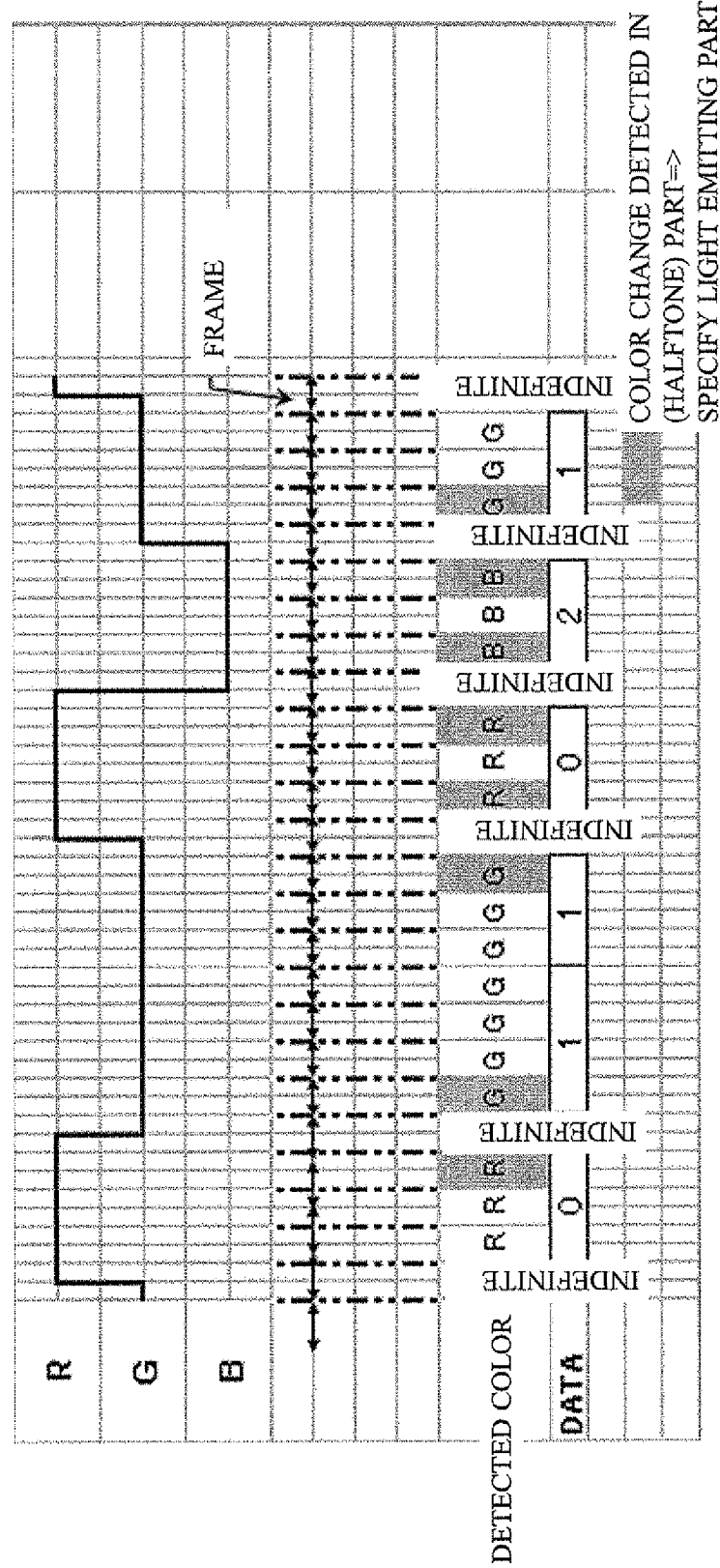
FIG. 2 is a sequence diagram showing light emitting states of LEDs of respective RGB colors, particularly a sequence diagram showing an example where data are allotted to the respective colors.
Figure 3:
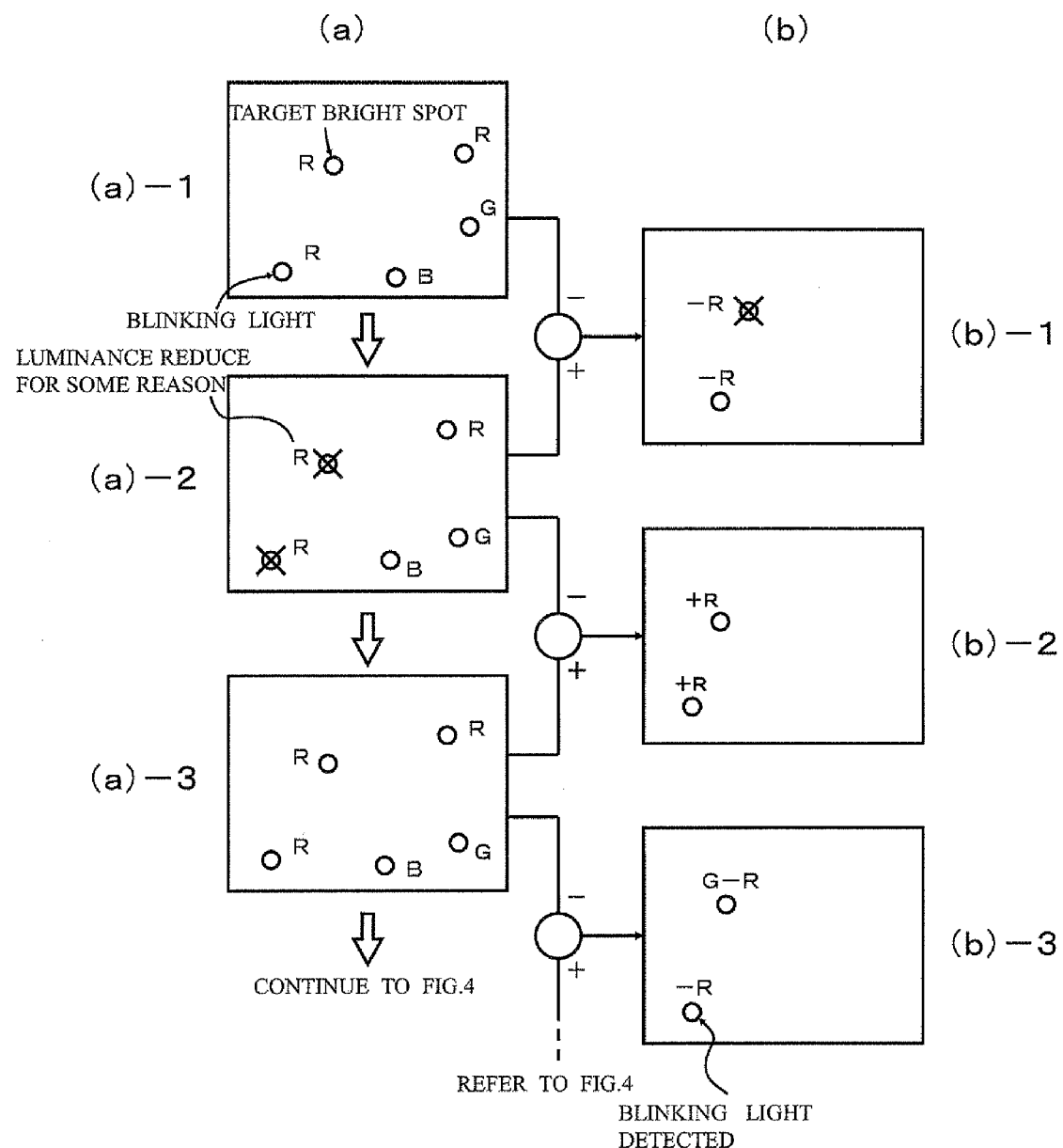
FIG. 3 is a diagram showing an operation of a technical plan 1.
Figure 4:
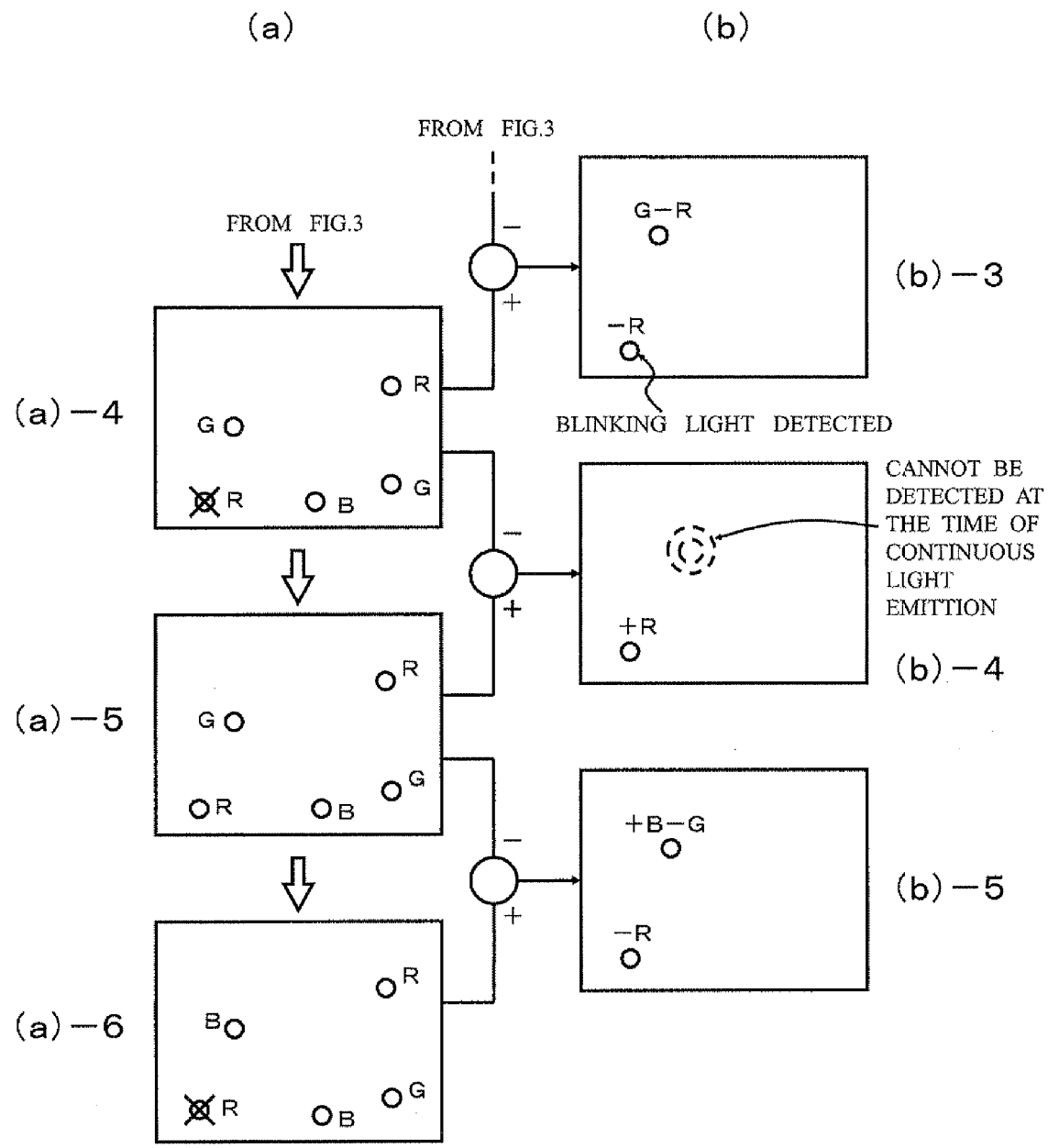
FIG. 4 is a continuation of the diagram showing the operation of the technical plan 1.
Figure 5:
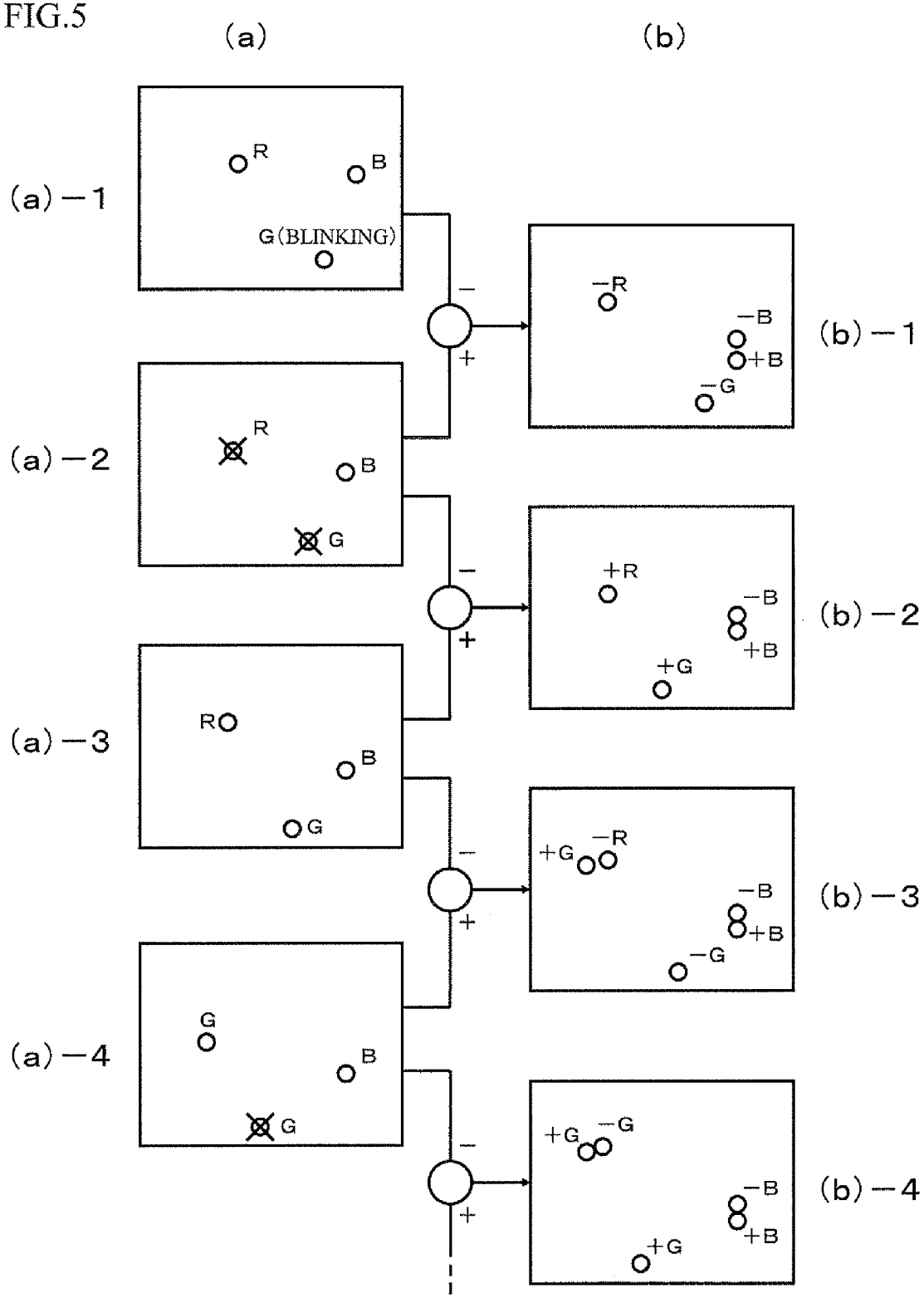
FIG. 5 is a diagram showing an operation when light emitters of the technical plan 1 move.
Figure 6:
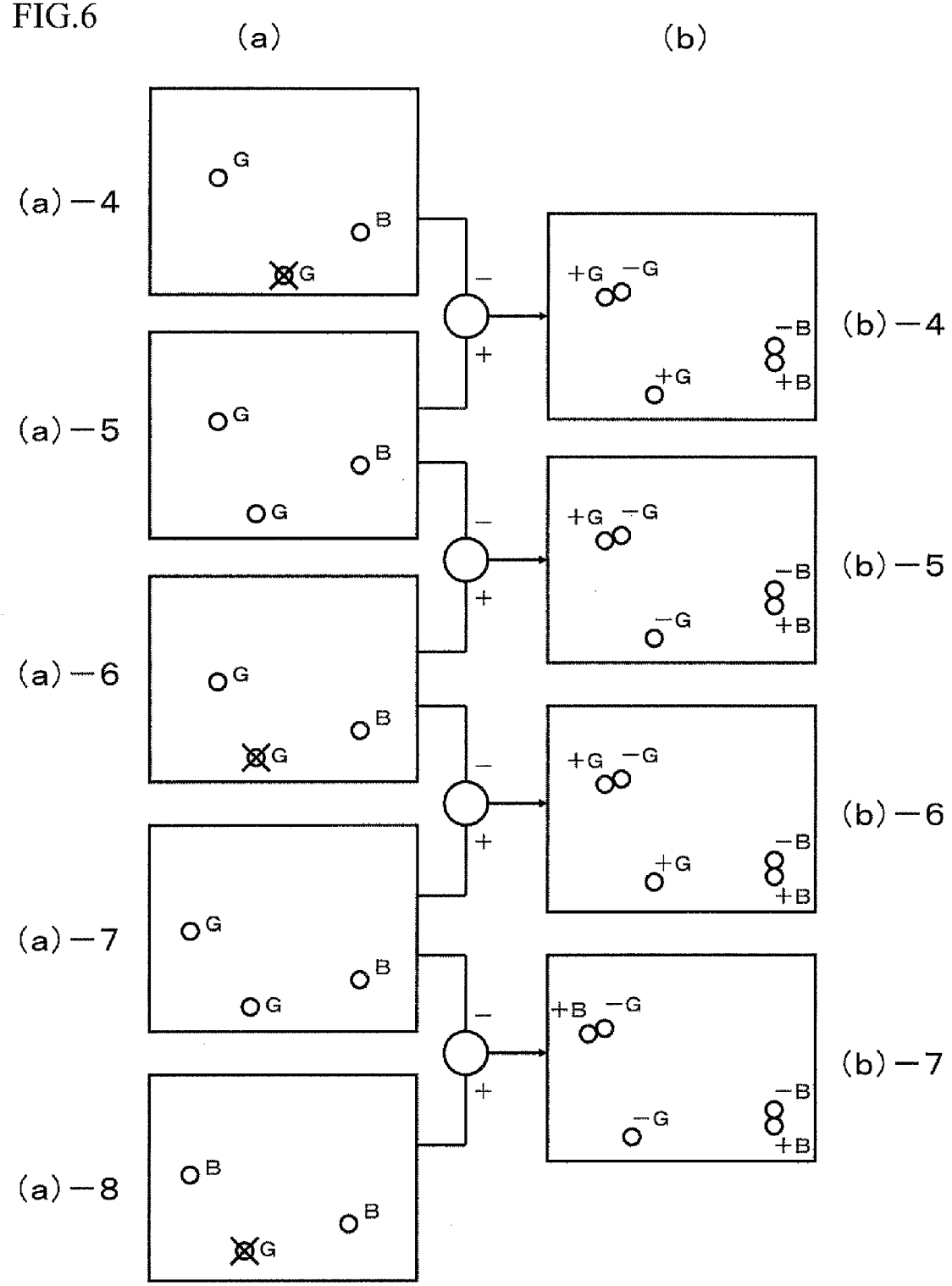
FIG. 6 is a continuation of the diagram showing the operation when the light emitters of the technical plan 1 move.
Figure 7:
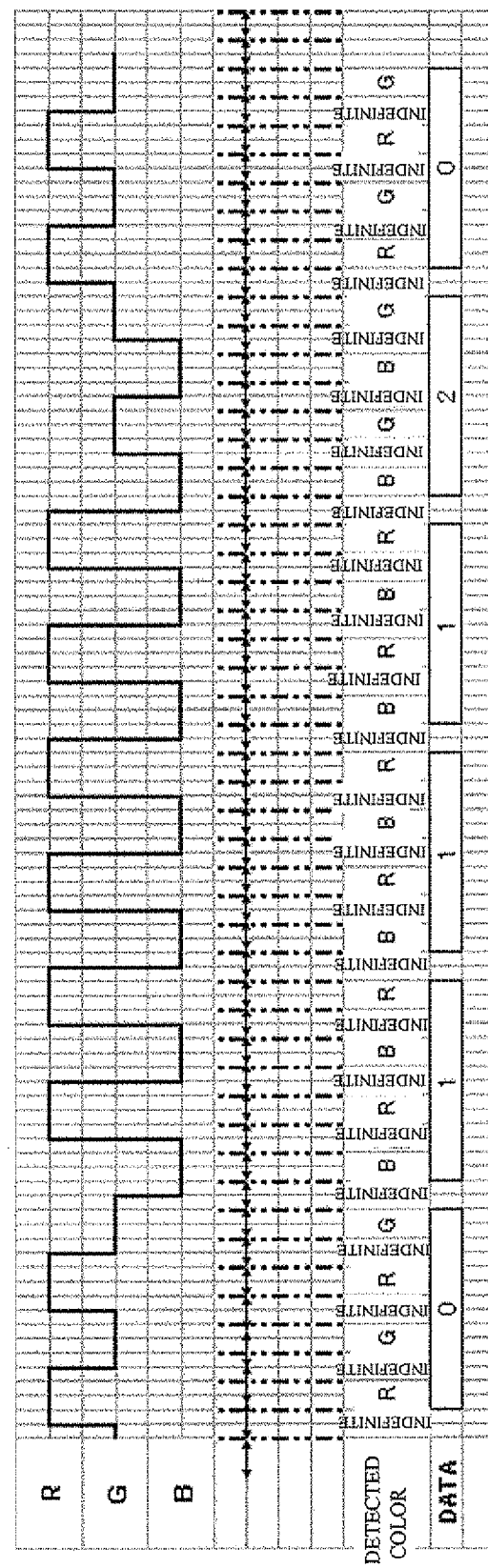
FIG. 7 is a sequence diagram showing an operation of a technical plan 2 when data are allotted to color changes.
Figure 8:
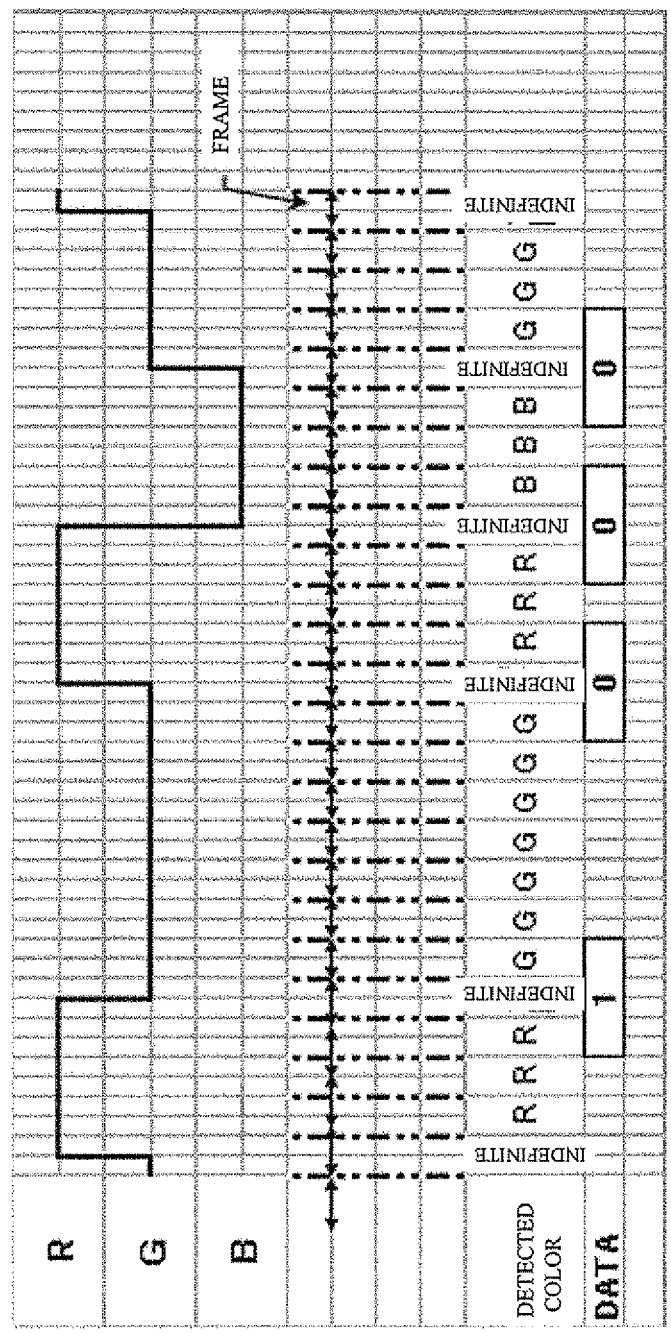
FIG. 8 is a sequence diagram showing an operation of a technical plan 3 when data are allotted to color changing directions.
Figure 9:
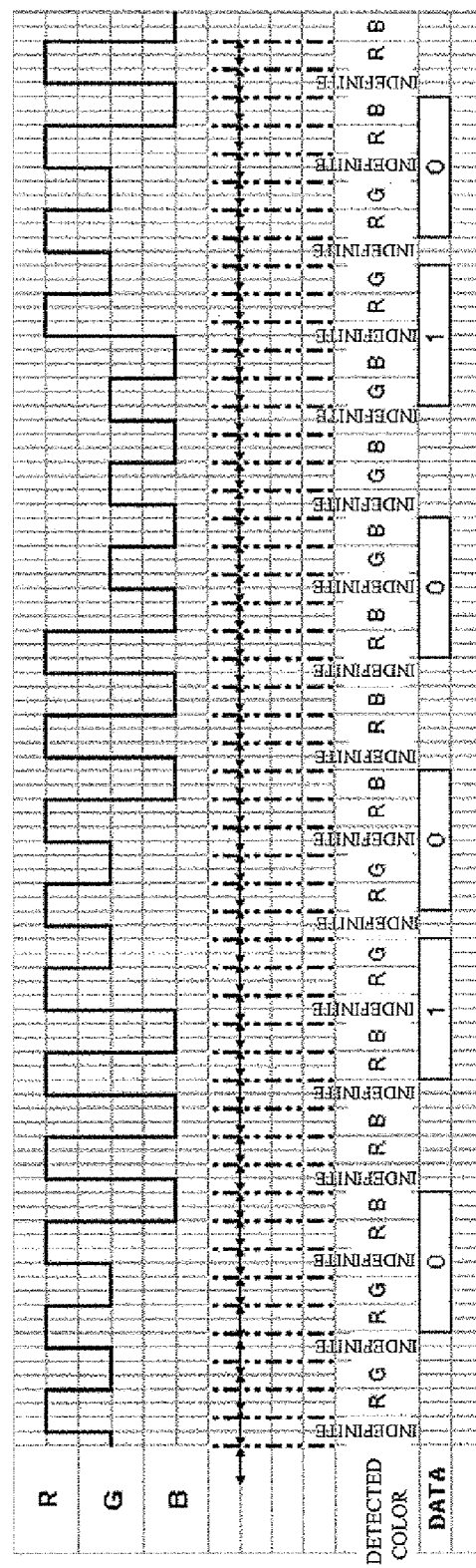
FIG. 9 is a sequence diagram showing a light emission pattern in an embodiment, FIG. 10 are sequence diagrams showing examples in the case of using changes of emission intensity (pulsation)

FIG. 9 shows a sequence diagram showing a light emission pattern in this embodiment. As shown in this sequence diagram, light of any one of RGB is emitted at one time in this embodiment similar to various technical plans described above. Sampling is performed at a time frame shown by chain double-dashed line in FIG. 9 to detect color. If the color does not change during the frame, the sampled color is uniquely determined. However, if sampling is performed at such a timing as to change the color during the frame, a sampling value becomes indefinite (see FIG. 9).

Values of data detected by sampling are shown in the bottommost row of FIG. 9.

As shown in FIG. 9, in this embodiment, data is allotted to each "change of a change" (a switch of a cyclic color change) as follows.

R*G→R*B: "0"
R*B→R*G: "1"
R*B→G*B: "0"
G*B→R*G: "1"

(Although not shown in FIG. 9, the following allotments are also made.)

G*B→R*B: "1"
R*G→B*G: "0"

As already described, the latter "change" in the change of the change is a cyclic color change and means cyclic and alternate display of color R and color G, for example, like R*G. On the other hand, the former "change" is a change of a "color change", specifically a change of a combination of colors to be displayed. Particularly, in this patent, the former "change" is often called a "switch" for easier distinction. In other words, expressions such as "a switch of a color change" and "switch a cyclically changing color" are employed.

Note that the switch is meant to include not only the change of the cyclically changing color, but theoretically (as the scope of the invention) also a timing change. For example, R-G-R-G and G-R-G-R are technically identified as difference color changes. Of course, for the sake of decoding, these color changes may be recorded as the same color changes.

Since color changes repeat like R*G in the embodiment 1, it is easy to recognize the color changes if frame differences are used. Since it is sufficient to be able to confirm color changes, an object can be tracked based on frame differences between respective frames or of every other frame.

Note that a frame period is set to be shorter than half the color changing cycle. In the example of FIG. 9, a changing cycle of R-G is six units in FIG. 9, but the frame period is two units.

In the example of FIG. 9, color changes such as R*G are respectively assumed to repeat three times. As a result, if a change of any one of three repetitions can be detected, it is possible to detect and track an object.

Further, since data is presented by a "switch" of a "color change", it is not, in principle, necessary to synchronize timing. In other words, it is sufficient to be able to detect a "switch" and, regardless of a sampling timing, there is no influence of an error.

Specifically speaking, even if the same data continues, a "switch of a change" representing this data occurs without fail. Thus, if sampling is performed to such an extent that the "switch of the change" can be detected, the data can be obtained without fail.

On the contrary, since data are allotted to color changes, for example, in the technical plan 2, the change of the same colors continues when the same data continues and sampling needs to be performed at synchronized timings (it is necessary to exactly know the length of one data beforehand and exactly measure this length).

In other words, as compared with the technical plan 2, data can be detected without missing any by detecting a switch of a color changing state (change of a color change) according to this embodiment even in such a case where the same data continues.
Calibration of Three Colors Since three RGB colors inevitably appear before and after a "change of a color change" according to this embodiment, a relative relationship of these can be constantly recognized and RGB can be correctly recognized. In other words, it is possible to calibrate the three colors.

From another perspective, this is largely related to the fact that changes of the same two colors (e.g. R*G (R→G→R→G)) do not continue for a plurality of periods as in the example of the "technical plan 1". That is, since a transition to another pattern is inevitably made during one period, there is a feature that the three colors regularly appear without fail. Since the values can be regularly recognized again in this way according to this embodiment, this embodiment would be said to have adaptivity to disturbance and high resistance to disturbance.

Here, one period fundamentally means one period representing one data such as "0" or "1" and is substantially the same as a period during which changes of certain two colors repeat. Since periods of repeating the same two colors are actually often same, this repeating period is called one period for the sake of convenience.

In this method, how many times alternate light emissions like R*G are repeated is fundamentally arbitrary and needs not to be an integral multiple of R→G as one cycle. Specifically, light emissions may be completed like R→G→R→G→R (2.5 cycles) In short, it is sufficient to be able to detect a change. In this case, 2.5 cycles constitute "one period". However, as described next, a cycle of one period may slightly change.

The cycle of one period is same in many cases as described above. If a property that the periods may differ is used, a change preferably continues, for example, after either one of the pair of colors after a switch appears when a color changing state is switched. This is described in detail below.

For example, in the case of changing from R*G to R*B, the color change may be changed (a color changing state is switched) after R as a common color appears. In another expression, the color change is started after the switch from R as a common color.

R-G-R-G-R-B-R-B- . . .

If the "color change is changed after the common color appears" or if the "color change after the change is started from the common color" in this way, there is an advantage of producing no other combination of colors. In this example, the other combination is a color change of B-G-B-G.

In the above example, R-B-R-B starts once "R" is reached.

In another expression, the color change "R-B-R-B" after the switch is started from "R".

On the other hand, unless the switch is made after the common color is reached, there is a possibility of adopting a switch of a color change:

R-G-R-G-B-R-B-R- . . .

for example, in the case of a change from R*G to B*R. However, in this case, there is a possibility of producing another color change G-B on the way and causing a reading error. This G-B is neither R*G before the switch nor B*R after the switch.

Accordingly, in this embodiment, an occurrence of a reading error is prevented by elaborating to switch a color change after a color common to a "color change" before the switch and a color change after the switch (this is called a common color) is reached when the "color change" is switched.

This is a feature of this embodiment and one of factors that could ensure high data reliability. In this respect, this embodiment has greater advantages as compared with the technical plan 2 described above.

Modification 1 of Embodiment 1

Although the case of three colors of R, G and B is described in the embodiment 1 described above, it goes without saying that four or more colors can be used. However, since higher accuracy in color detection is necessary if the number of colors increases, about three is thought to be an appropriate number of colors in consideration of a use environment and the like.

Although the light emitting means capable of emitting lights of three colors R, G and B is assumed in this embodiment, it is possible to easily realize such a light emitting means and increase the number of colors if a full-color LED or the like is utilized. It is also preferable to prepare light emitting means for each color and use the respective light emitting means in a switching manner.

For example, it is also a preferable mode to arrange three LEDs of three colors R, G and B proximate to each other.

Although the example where light of only one of RGB is emitted is described in the present patent, lights of a plurality colors out of three primary colors may be emitted. This is, after all, equivalent to an increase in types of colors used.

The use of a display device (or a part thereof) such as a liquid crystal display or a plasma display as the light emitting means is also a preferable mode.

Modification 2 of the Embodiment 1

Similar effects are obtained even if emission intensity changes (pulsation) are used instead of the color changes.

Figure 10:
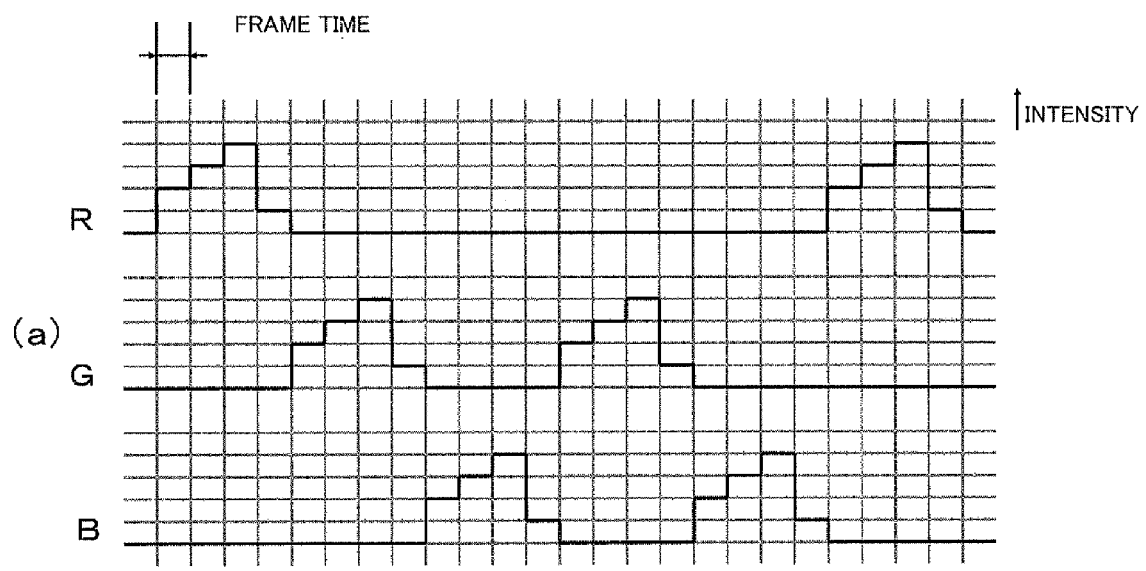
Figure 10:
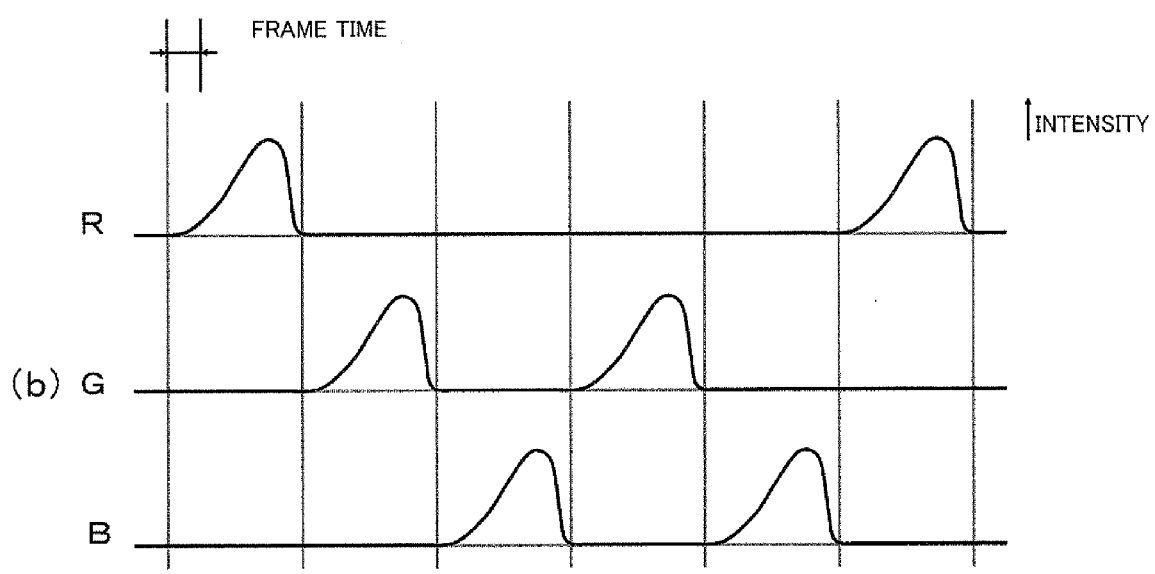

For example, by causing lights to be emitted as shown in FIGS. 10, signals having different intensities while having the same color phase can be recorded for each frame and tracking can be performed by extracting signals only based on differences between the frames.

FIG. 10A shows a sequence diagram in which a horizontal axis represents time and a vertical axis represents emission intensity. As shown in FIG. 10A, light is emitted at a different emission intensity for each frame in the case of emitting R (red) light. In an example of FIG. 10A, the emission intensity changes in "2"→"3"→"4"→"1".

In this example, an "intensity change" of "2"→"3"→"4"→"1" changes. As shown in FIG. 10A, in this example, "color" of this "intensity change" of "2"→"3"→"4"→"1" changes. That is, after R light is emitted with the above intensity change, the color of light to be emitted is changed to G and light is emitted again with the same intensity change. Also, a state where the color is further changed to B and light is emitted with the same intensity change is shown in FIG. 10A.

Thus, the latter change of the "change of the change" in this example is a change of emission intensity (pulsation) and the former change is the color change.

Since the emission intensity changes in this case, the color phase can be accurately captured at any one of the intensities even if a dynamic range of a CCD used is narrow. Accordingly, there is an effect that expensive functions need not be incorporated to adjust the camera and ensure a sufficient dynamic range of the CCD and adjustments can be easily performed.

Since it is difficult to determine a temporal position of a camera frame with respect to an emission intensity change, elaboration is needed to make a light emission/exposure amount certainly different between the respective frames. In FIG. 10, the exposure amount for each frame is made certainly different by making the intensity change (pulsation) temporally asymmetric. In other words, it is elaborated lest the intensities of any two frames should coincide by changing the emission intensity in "2"→"3"→"4"→"1".

Although the example where the emission intensity "changes" stepwise is shown in FIG. 10A, a construction for continuously changing the emission intensity as shown in FIG. 10B is also preferable.

Embodiment 2: Plural Light Emitters

In the embodiment 1 is described the example where 1-bit data is recorded every time the color change is switched. Accordingly, let us study a switch of a color change, for example, under the following conditions.

Frame rate of a CCD camera used is 30 fps

Color changes every ⅕ sec.

Every time this color change occurs three times, this "color change" is switched.

* Note that the switch of the "color change" means a change of a combination of colors used for this "color change". For example, a change from R*G to B*G is the switch of the "color change" mentioned here.

However, in principle, not only a change in color, but also a change in timing is treated as a switch of a color change. For example, a color change G→R→G→R at the same timing as a color change R→G→R→G or the like can be treated as a different color change, i.e. a switch of a color change. Such examples are described in detail later.

As mentioned before, a state where R and G lights are alternately emitted is denoted as R*G in the present patent and this is called a "color change". R*B, G*B also denote similar states.

Under such conditions, the "change" of the "color change" occurs five times per second, which means a data emission rate of 5 bits/sec.

Plural Light Emitters

As one means for increasing this data rate, it is thought to arrange a plurality of light emitters. If n light emitters are arranged, the data rate is, in principle, n-fold. However, it is, of course, necessary to distinguish the respective n light emitters. For example, which digit of a binary number is represented by which light emitter needs to be made clear beforehand.

However, realistically, it is generally difficult in many cases to distinguish each of a plurality of light emitters For example, it is generally difficult in many cases to individually distinguish each of a plurality of light emitters in the distance. When an object is moving, the orientation thereof may change in various manners and it is difficult in many cases to distinguish the respective light emitters from a positional point of view.

Accordingly, let us study a technology for reading data in a state where each of a plurality of light emitters cannot be distinguished below. For example, in the case of two light emitters, it is assumed that an arrangement of two can be recognized, but even if the positions of the two are switched, it cannot be recognized.

Hereinafter, the case of two light emitters is described in the embodiment 2.

In the embodiment 2, light emission patterns are, as a general rule, assumed to follow methods similar to those described in the previous embodiment 1. However, it is assumed that the same colors are not adjacent to each other at the same timing. By adding this condition, data can be read even if the two light emitters cannot be distinguished.

In this embodiment, distinguishable light emission manners (color changes) areas follows. Note that notation R*G and notation G*R are common in that R light and G light are alternately emitted, but the phases thereof are opposite.

In this embodiment, similar to the embodiment 1, the respective light emitters employ patterns of alternately emitting lights of two colors using three RGB colors. The following light emission patterns can be recognized as those of the first and second light emitters.

|  | 1st LE |  | 2nd LE (Light Emitter) |
|---|---|---|---|
| Pattern 1: | R*G | + | G*R (←phases of changes are opposite) |
| Pattern 2: | R*G | + | B*R |
| Pattern 3: | R*G | + | G*B |
| Pattern 4: | B*R | + | R*B |
| Pattern 5: | G*B | + | B*G |
| Pattern 6: | B*R | + | G*B |

Here, although the two light emitters are called the first and second light emitters here, the patterns in which the two light emitters are exchanged for each other cannot be, in principle, distinguished since the both light emitters cannot be distinguished as described above. In other words, a pattern obtained by exchanging the patterns of the first and second light emitters of the pattern 1 is also recognized as the pattern 1 and not distinguished.

Thus, in the embodiment 2, color changes of the two light emitters are called patterns.

The above six patterns can change from one to another. In this embodiment 2, similar to the embodiment 1, data is represented by a switch of the pattern (switch of the color change). Since there are five ways of transition from a certain pattern to another pattern, 0, 1, 2, 3 and 4 can be represented by one pattern change. In other words, a digit of a quinary number can be represented.

Figure 11:
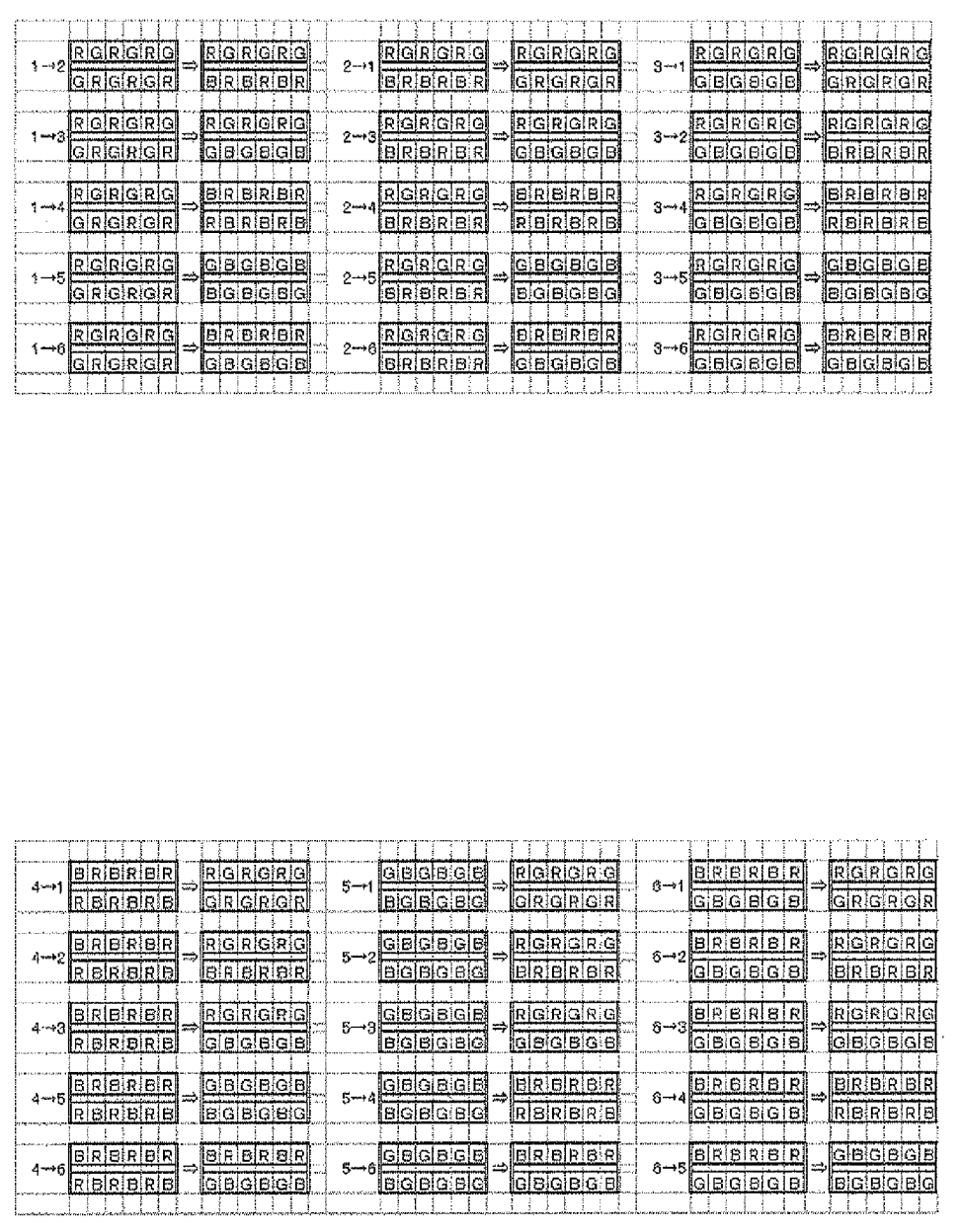

This state is shown in FIG. 11. In this way, a transition from each pattern to another pattern other than itself (switch of a change=change of a change) is possible. Note that, in FIG. 11, "1" indicates the pattern 1 and "1→2" means a change from the pattern 1 to the pattern 2.

Since one change (change of a change) produces five values (five types), it becomes one digit of a quinary number. If this is applied to the above example, $5^5$ (=3125) data, i.e. a data amount under 12 bits can be sent out per second since five changes can be made per second.

In other words, since one digit of a quinary number can be sent five times in a second, 3125 types of data can be represented.

In FIG. 11, six juxtaposed grids diagrammatically show a state of a color change, wherein a lateral direction represents the passage of time. For example, RGRGRG shows a state where R and G lights are alternately emitted, i.e. R*G. As described above, GRGRGR is denoted as G*R and the phase is also considered.

This arrangement of six grids in each of upper and lower levels represents that there are two light emitters, and the "color of the change" is represented by a total of twelve grids. In FIG. 11, each double line arrow represents the switch of the "color change" and the twelve grids before and after the double line arrow represent the switch of the color change. Of course, the twelve grids before the double line arrow represent the "color change" before the switch, and those after the double line arrow represent the "color change" after the switch.

As described above, data can be transmitted even if the first and second light emitters cannot be distinguished.

Modification 1 of the Embodiment 2

In the above embodiment 2, the first and second light emitters are not permitted to be in the same color at the same timing. Here is described an example where adjacent light emissions of the same color are permitted at the same timing (modification 1). However, a case where "color changes" of the first and second light emitters are perfectly identical is not permitted. There is described only an example where the same color of lights can be emitted only in parts of light emission patterns. The other conditions are same as in the embodiment 2.

Patterns recognizable in the case where the first and second light emitters are permitted to emit the same color of lights at some timings as described above are as follows.

Pattern 1: R*G+G*R
Pattern 2: R*G+B*R
Pattern 3: R*G+R*B
Pattern 4: R*G+G*B
Pattern 5: R*G+B*G
Pattern 6: G*B+R*B
Pattern 7: G*B+B*R
Pattern 8: G*B+B*G
Pattern 9: B*R+R*B There are these nine patterns. Usable patterns are increased in number as compared with the embodiment 2 since the light emissions of the same color are permitted at some timings.

Since each of these patterns can transition to another pattern other than itself (change of a change=switch), one change (switch of a change) produces eight values and $8^5=2^{15}$ (32768). Thus, a data amount of 15 bits can be represented by one "switch of a change".

Figure 12:
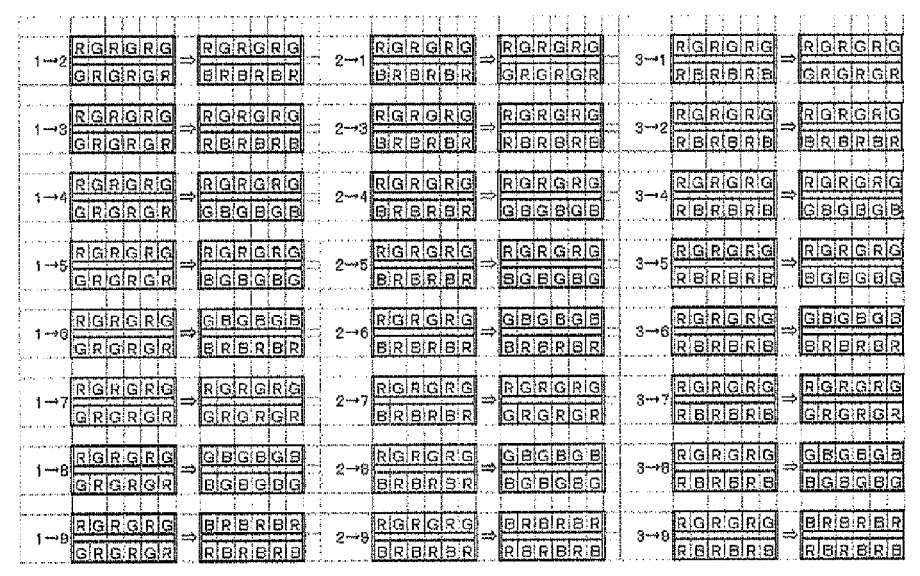
Figure 13:
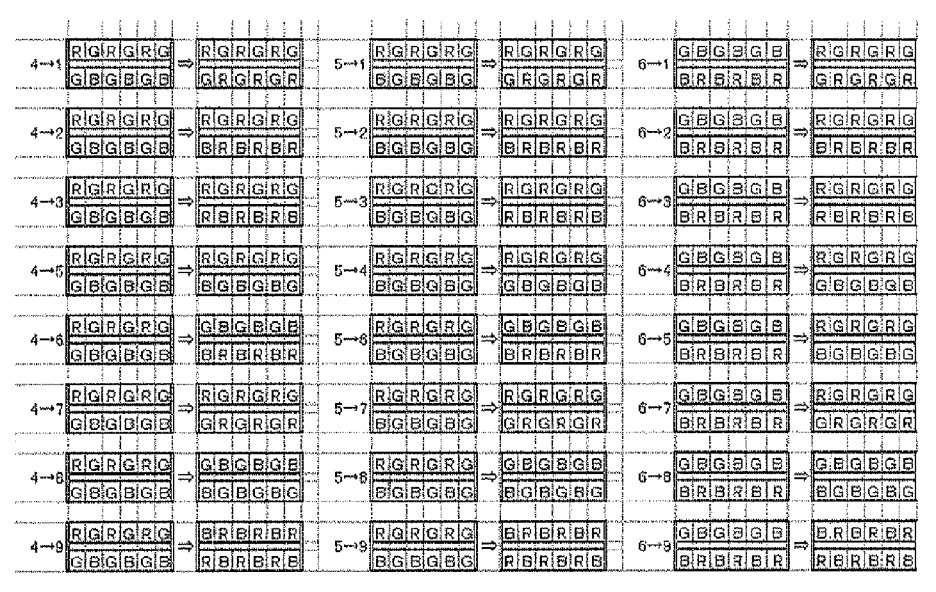
Figure 14:
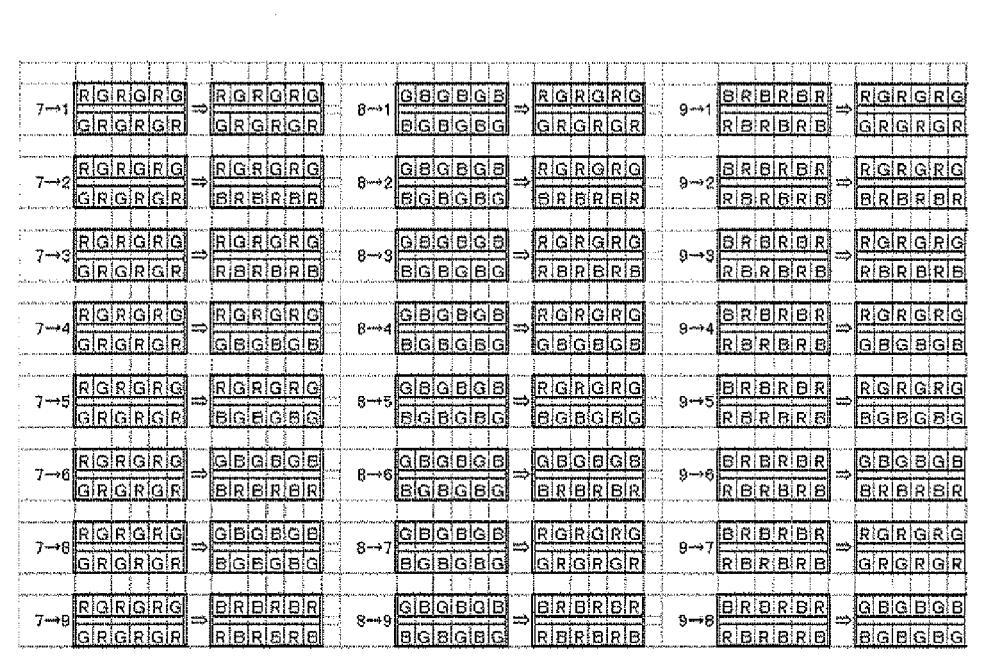

States of changes from one pattern to another are shown in FIGS. 12, 13 and 14. For example, a case of a change from the pattern 3 to the pattern 7 is represented by "3→7" and the meaning of the respective grids is as described above.

Modification 2 of the Embodiment 2

Although the two light emitters are used in the embodiment 2 and its modification 1, more data can be represented and transmitted if three light emitters are used.

Here is described an example where adjacent light emissions of the same color are permitted at the same timing similar to the modification 1. Of course, a case where "color changes" of any two of first, second and third light emitters are completely identical is not permitted. There is described only an example in such a situation where the same color of lights can be emitted in parts of light emission patterns. The other conditions are same as in the embodiment 2.

In the case of arranging three light emitters in this way, the following 45 light emission patterns can be recognized.
Pattern 1: R*G+G*R+R*G
Pattern 2: R*G+B*R+R*G
Pattern 3: R*G+R*B+R*G
Pattern 4: R*G+B*R+G*R
Pattern 5: R*G+B*G+R*G
Pattern 6: R*G+G*B+R*G
Pattern 7: R*G+B*G+G*R
Pattern 8: R*B+B*R+R*B
Pattern 9: R*B+B*G+R*B
Pattern 10: R*B+G*B+R*B
Pattern 11: R*B+B*G+B*R
Pattern 12: R*B+R*G+R*B
Pattern 13: R*B+G*R+R*B
Pattern 14: R*B+R*G+B*R
Pattern 15: G*B+B*G+G*B
Pattern 16: G*B+R*G+G*B
Pattern 17: G*B+G*R+G*B
Pattern 18: G*B+R*G+B*G
Pattern 19: G*B+R*B+G*B
Pattern 20: G*B+B*R+G*B
Pattern 21: G*B+R*B+B*G
Pattern 22: R*G+B*R+R*B
Pattern 23: R*G+G*R+R*B
Pattern 24: R*G+G*B+R*B
Pattern 25: R*G+B*G+R*B
Pattern 26: R*G+R*B+B*R
Pattern 27: R*G+G*R+B*R
Pattern 28: R*G+B*G+B*R
Pattern 29: R*G+G*B+B*R
Pattern 30: R*G+B*G+G*B
Pattern 31: R*G+G*R+G*B
Pattern 32: R*G+R*B+G*B
Pattern 33: R*G+B*R+G*B
Pattern 34: R*G+G*B+B*G
Pattern 35: R*G+G*R+B*G
Pattern 36: R*G+B*R+B*G
Pattern 37: R*G+R*B+B*G
Pattern 38: B*G+B*R+R*B
Pattern 39: B*G+G*B+R*B
Pattern 40: B*G+G*R+R*B
Pattern 41: B*G+R*G+R*B
Pattern 42: B*G+R*B+B*R
Pattern 43: B*G+G*R+B*R
Pattern 44: B*G+R*G+B*R
Pattern 45: B*G+G*R+B*R Since each of these patterns can change to another pattern other than itself (switch a change), one change (a switch of a change) can produce 44 values and $44^5 = 164916224$ data, i.e. a data emission rate of about 27 bits.
Intermediate Summary 1

By incorporating a light emitting device including one or more light emitters according to the embodiments described above into an aircraft, a vessel, a vehicle or the like, it was possible to realize a technology capable of detecting the position of an object while performing the display, communication and the like of data based on switches of color changes and easily recognizing and tracking the object.

Particularly, according to the technology described in these embodiments, it is possible to photograph an object having a light emitting device attached thereto by a CCD camera or the like and receive an ID of the object and various pieces of information of a plurality of objects on screens of photographed images while tracking these objects.

In other words, it is possible to obtain information on the object while tracking the "position" of the object.
Relationship between an Object and a Camera Although a mode in which an object moves and a camera photographs the object has been mainly described thus far, it, of course, does not matter even if the mode is reversed.

For example, it is also preferable that a photographic camera is attached to a moving body and light emitting devices are attached to traffic signs on the ground. As a result, a system can be obtained which enables not only the positions and directions of the traffic signs, but also the meanings thereof to be known.

This also contributes to constructing a system which gives a warning and the like to a driver based on the obtained direction of the traffic sign and the content thereof.

Besides, by the photographic camera on the moving body photographing a predetermined light emission pattern emitted from a fixed object on the ground, a system can be obtained which enables the moving body side to receive various data such as a direction toward the light emitting device and traffic information. Thus, according to this system, there is a possibility that information useful for navigation and driving can be efficiently given to the moving body.
Embodiment 3

As described thus far, it has become possible to track an object and read displayed data by using switches of color changes.

A more specific data representation method is considered below.

First, regularity of making light emission patterns coherent data is considered. It is possible to display certain data by the technique described above. However, such a display of data is merely a list of data and it is necessary to clarify delimiters in order for this list of data to make sense.

Further, considering the characteristic of the present invention and the characteristic of the proposed light emission patterns, the presence of "ID data" indicating what is a light emitter (light emitting device) is generally necessary.

Further, considering the amount and rate of data that can be transmitted by this method, at is possible to superimpose (add) certain "transmission information" on (to) the "ID data", which is meaningful for use in many cases. For example, the name of a good (vegetable) is an ID and it is thought to further add a date of packing.

To accurately transmit these data, transmission can be made with fewer errors if there is a margin where the above date is not present. In other words, it could be intuitively understood that the presence of the above delimiters is convenient in reading data.

Further, considering performance variation and type of a receiver including a CCD camera or the like and a reading environment including noise such as outside light and the like when the receiver is used, there is rather a potential risk of being unable to transmit data at all by light emission in a single pattern (cycle, color, luminance, etc.).

It is also thought to transmit a data component, which changes with time, besides the ID. Thus, it is thought to be preferable in terms of transmission reliability, for example, to transmit an ID and a transmission specification of data for every "delimiter" described above.

Figure 15:
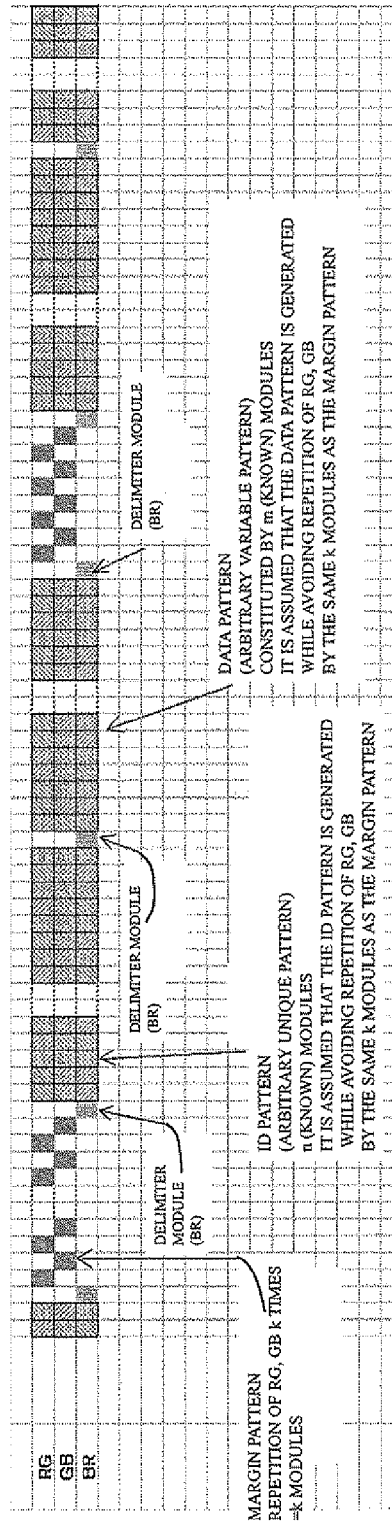
FIG. 15 is a diagram showing a state of a code when delimiters and margins are provided and also a ID and data patterns are provided in a communication format.

FIG. 15 is a diagram showing a state of a code where delimiters and margins are provided and ID and DATA patterns are provided.

In an example shown here, a pattern of repeating only R*G and G*B is used as a margin pattern. Although R*G and G*B are repeated, for example, k (k is a positive integer) times in FIG. 15, it does not matter how many times they are repeated.

Further, a unit of a bunch of alternate light emissions (between other combinations of alternate light emissions) such as R*G is called a module. In FIG. 15, this module is represented by one grid. Each grid in FIG. 15 represents an alternate light emission pattern of two colors such as R*G or G*B.

As shown in FIG. 15, grids in the upper level of FIG. 15 represent alternate light emissions of R and G as shown at the left side. Grids in the middle level represent alternate light emissions of G and B likewise as shown at the left side. Grids in the lower level represent alternate light emissions of B and R likewise as shown at the left side.

Here is employed such a configuration that the ID pattern follows the margin pattern with B*R as a delimiter module therebetween, then the DATA pattern follows with B*R as a delimiter module therebetween and the margin pattern follows with B*R as a delimiter pattern therebetween (see FIG. 15).

Of course, three types of modules R*G, G*B and B*R are suitably used for the ID pattern and the DATA pattern.

In this embodiment, this communication/display unit composed of:
  margin pattern,
  ID pattern, and
  DATA pattern,
is called a cycle. Transmission of data by the cycle and reception of data and an ID by the cycle are thought to have a high affinity to existing general communication techniques and widen a range of applications.

At this time, the ID pattern and the DATA pattern are, as a rule of generating patterns, assumed to include no part that coincides at least with the repeating pattern of R*G and G*B composed of k modules similar to the margin pattern.

Although the ID pattern and the DATA pattern are subject to such a content restriction, they can have arbitrary lengths.

In this way, in the light emission pattern (cycle) employed in this embodiment, a margin pattern can be certainly found while at least one cycle of light emission pattern (one cycle) is tracked, and the ID pattern and the DATA pattern can be respectively confirmed while matching of the number of modules and delimiter modules is confirmed.

Accordingly, it is possible to more reliably perform a reading operation capable of flexible dealing with a data change.

Modification 1 of the Embodiment 3

It is also preferable to add a specification pattern in addition to an ID pattern and a DATA pattern by a similar mechanism and designate a data arrangement by reading the specification pattern.

Specifically, it is also preferable to set a cycle to be:
  margin pattern+delimiter module+ID pattern+delimiter module+DATA pattern+delimiter module+specification pattern+delimiter module.

Although the specification pattern is placed at the end in this example, it may be also preferably placed before the ID pattern.

As described above,
  blinking number of each module,
  blinking period,
  the number of modules of each pattern,
  color specification and luminance specification of RGB, and
  color change specification (overlapping period or specification of an off-period)

and other factors can be thought to be represented by this specification pattern.

Modification 2 of the Embodiment 3

In the examples described thus far, data is communicated using the one cycle. This cycle is preferably successively repeated at least twice. This is because, if light is emitted at least in two successive cycles, a possibility of at least reading data of the entire one cycle out of the two cycles increases and a possibility of a success in tracking increases.

On the other hand, in a mode in which one cycle emission is performed after the elapse of a certain off-period following one previous cycle emission, a possibility of missing the entire cycle increases if the first part of the cycle is missed, which results in an increased possibility of a failure in tracking. On the contrary, if light is emitted in two successive cycles, there is a possibility of reading the second cycle even if the first cycle is missed due to the presence of a margin pattern or the like.

Thus, it is preferable in terms of improving data reading accuracy and a possibility of a success in tracking an object to emit light at least in two successive cycles.

Embodiment 4: Specific Construction of a Light Emitting Device

Figure 16:
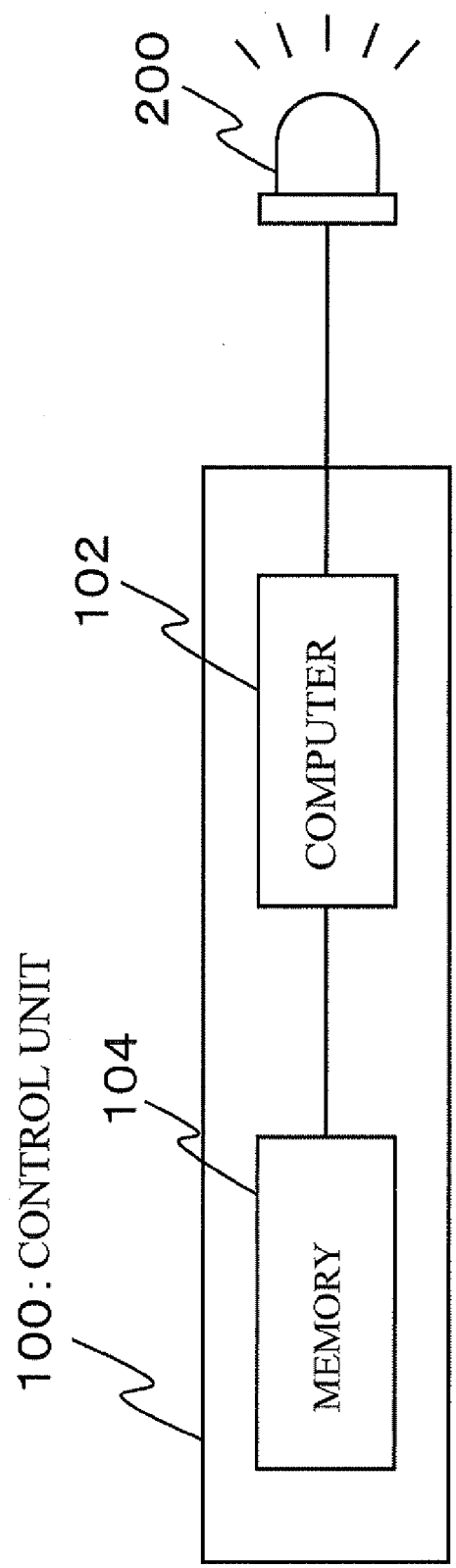
FIG. 16 is a construction diagram of a light emitting device composed of a light emitter and a control unit.

Although the light emitting device including the light emitter that emits light in the light emission patterns of the predetermined colors has been described thus far, such a light emitting device preferably includes a light emitter and a control unit. This construction is shown in FIG. 16.

A control unit 100 preferably includes a computer 102 and a memory 104 storing light emission patterns. Besides the light emission patterns, a table indicating a correspondence relationship between data to be represented and light emission pattern changes is also stored in this memory 104. When receiving data to be displayed from the outside, the computer reads the light emission pattern after a change for representing the data from the table based on the present light emission pattern and causes the light emitter to emit light in the light emission pattern after the change.

Various light emission patterns can be utilized. In the respective examples described thus far, color changing patterns are mainly described. However, as described in the modification of the embodiment 1, changing patterns of luminance intensity may be utilized. It is also preferable to combine these color and luminance changes.

In the embodiments described thus far, the invention has been mainly described based on the "change of the change". Various changes can be utilized as the former change (often called a "switch" for distinction purpose) and the latter change. Although the color changes have been mainly described in the above respective embodiments, it is also preferable to utilize emission intensity changes or changes of combinations of these with color changes.

At any rate, it is preferable to store these patterns in the table of the memory 104 beforehand.

Various modes are thought for the flow of data display. It is also preferable to provide data bit by bit from the outside. A mode is also preferable in which a plurality of bits are collectively given to the control unit 100 and the control unit 100 stores them in the memory and successively switches the light emission pattern to represent this data.

Note that the light emitter 200 preferably includes a full-color LED or the like as described above. It is also preferable to use LEDs of three colors, i.e. an R-LED, a G-LED and a B-LED while successively switching them. Of course, it is also preferable to use these three LEDs as a full-color LED. It is further preferable to partly or entirely utilize various display devices.

The light emitting device is preferably constructed to be small and portable, but it is also preferable to utilize an existing notebook computer. For example, the notebook computer includes a memory (hard disk, semiconductor disk), etc. for storing light emission patterns, etc. and also includes a backlighted display as a light emitter. Thus, the construction of the light emitting device can remain unchanged.

Embodiment 5

Since the color cyclically changes in the embodiments described thus far, so-called "continuous" light emission is very useful. Since light emission is "continuous" as described above, a possibility of missing an object upon chasing and tracking the object can be reduced and a system having a high degree of convenience can be constructed.

Although it depends on an implementation technique, if a continuously interrupted period (off-period) can be suppressed to at most two cycles, an object can be efficiently chased and tracked in many cases according to an experiment of the present inventors.

Embodiment 6: Separation of Tracking and Recognition

According to the light emitting device described above, it is, in principle, possible to recognize an object having this light emitting device attached thereto and track a moving object.

However, hardware whose computing power is not so high may be utilized depending on circumstances. Further, there may be many types of objects, there may be many individual objects to be simultaneously recognized and moving speeds of objects may be high. If common hardware is used, it may be difficult to perfectly simultaneously recognize and track objects.

Accordingly, there is proposed a mode for separately performing recognition and tracking in an embodiment 6.

Specific Flow (Step 1) First, a change of a color change is recognized and an object is recognized.

(Step 2) The position of the recognized object is specified.

(Step 3) Points where color has changed are obtained from photographed images.

(Step 4) A point where the color (or luminance) has changed is searched near the position of the object in Step 2.

(Step 5) The searched point is acknowledged as a new position of the object.

In this way, recognition as to what is an object is performed only in the first Step 1. Thereafter, tracking is performed by detecting only a movement of the object based on the change of the color or the like on images.

This technique is simple, but has a great advantage depending on purposes since tracking is possible even if the number of objects increases.

Since tracking and recognition are separated in this way in this embodiment 6, the amount of computation that has to be performed at one time can be reduced and a possibility of being able to recognize and track objects increases even when there are many objects or when moving speeds of objects are high.

Modification of the Embodiment 6

(1) Relationship Between Recognition and Tracking Timings: Modification

Although recognition is performed only in the first Step 1 in the example described above, it is also preferable to regularly (once every several minutes) perform recognition. Even with such a process, the amount of computation can be reduced.

It is also preferable to perform "recognition" when an object is static and perform "tracking" when the object is moving. It is preferable to perform recognition as long as the object is static and stop recognition and concentrate on tracking when the object starts moving.

(2) Modification of the Recognition Method (Case of Employing Another Recognition Method).

Although the technique of representing data by a "change of a change" of color, so to speak, is assumed in the example described above, the technical principle of "separating recognition and tracking" is also applicable in the case of employing another recognition method.

For example, even if data are allotted not to "changes of changes", but to "color changes" or "colors" themselves as described in the above technical plan, it is possible to utilize separation of recognition and tracking.

In this case, (Step 1) Color (or color change) is recognized, data is restored and the content of an object is "recognized".

(Step 2) Step 2 and the succeeding Steps are the same as in the embodiment 6.

As described above, regardless of which recognition method is employed, a possibility of being able to recognize and track many objects and largely moving objects increases even in an apparatus whose processing power is not high and convenience is further improved by separating the recognition of the recognition method and tracking.

(3) Case where recognition was not possible

In the example described above, after recognition is first performed, the positions where color changes are detected to perform tracking. However, the first recognition may fail due to a reading error or the like.

In this case, it is also preferable to continue recognition until it succeeds, but this may hinder the fulfillment of the aim of reducing the computation amount.

Accordingly, it is preferable depending on circumstances to treat the case of being unable to perform recognition at first as an "unrecognized" case and track the position of an unrecognized object. In this case, recognition may be performed again at a later date based on recorded image data, wherefore it is useful in many cases to perform only tracking in the meantime.

Even if recognition was not possible, it may become possible to recognize an object due to a change in illumination environment or the like. Thus, it is also preferable to regularly (e.g. about once every several seconds or once every several minutes) perform a recognition process.

Provisional Data Allotment

If there are a plurality of objects which are treated as unrecognized objects and tracked by being unable to be recognized, it is preferable to allot provisional data and manage and identify the respective unrecognized objects using the provisional data. Thereafter, preferably, the recognition process is performed every time a predetermined period elapses and data are allotted in place of the provisional data when the data can be recognized.

Display of Data

It is recognition of an object to recognize light emitted from a light emitting device attached to the object and obtain data represented by the recognized light. The data of this recognized object is preferably displayed to a user together with the position of the object.

The position is preferably displayed by numerical values of a coordinate on image data, and also preferably displayed by an arrow indicating the position or a frame enclosing an area on an image. If the recognized data is also displayed near this arrow or frame, the position and the content of the object can be more easily simultaneously grasped, which is preferable.

Since the light emitted by the light emitting device is detected as an area, it is also preferable to display this area in a different color or by a boundary line or the like indicating the outline of this area. It is further preferable to display this area by a so-called zebra pattern.

The invention claimed is:

1. A light emitting device, comprising:
    a light emitter capable of emitting lights of at least three colors; and
    a control unit for cyclically changing the color of the light emitted by the light emitter,
    wherein the control unit switches the cyclic color change based on predetermined data representing an optical automatic recognition code, and represents the predetermined data by the switching of the cyclic color change.

2. The light emitting device according to claim 1, wherein:
    the color change is the one obtained by alternately emitting lights of two different colors, and
    the switching is to change at least one of the colors of the alternately emitted lights to another color.

3. An object tracking method for attaching a light emitting device for representing data representing an object by changing the color of emitted light with time to the object, recognizing the object and tracking the position of the object by recognizing the color of the light emitted by the light emitting device, comprising:
    a recognition step of recognizing the object by photographing an image including the light emitting device, recognizing the color of the light emitted by the light emitting device from the image and restoring the data, and specifying the position of the object based on the position of the recognized color;
    a tracking step of photographing images including the light emitting device, recognizing a change of the color of the light emitted by the light emitting device from the images, and tracking the position of the object based on the position of the color change; and
    a step of recognizing the object by performing the recognition step once, storing the recognized object in a predetermined storage together with the position of the object, thereafter repeatedly performing only the tracking step, and storing the position of the color change obtained in each tracking step as the position of the object in the storage, wherein the light emitting device further comprises:
    a light emitter capable of emitting lights of at least three colors; and
    a control unit for cyclically changing the color of the light emitted by the light emitter,
    wherein the control unit switches the cyclic color change based on predetermined data and represents the predetermined data by the switching of the cyclic color change.

4. An object tracking method for attaching a light emitting device for representing data representing an object by changing the color of emitted light with time to the object, recognizing the object and tracking the position of the object by recognizing the color of the light emitted by the light emitting device, comprising:
    a recognition step of recognizing the object by photographing an image including the light emitting device, recognizing the color of the light emitted by the light emitting device from the image and restoring the data, and specifying the position of the object based on the position of the recognized color;
    a tracking step of photographing images including the light emitting device, recognizing a change of the color of the light emitted by the light emitting device from the images, and tracking the position of the object based on the position of the color change; and
    a step of recognizing the object by performing the recognition step once, storing the recognized object in a predetermined storage together with the position of the object, thereafter repeatedly performing only the tracking step, and storing the position of the color change obtained in each tracking step as the position of the object in the storage, wherein the light emitting device further comprises:
    a light emitter capable of emitting lights of at least three colors; and
    a control unit for cyclically changing the color of the light emitted by the light emitter,
    wherein the control unit switches the cyclic color change based on predetermined data and represents the predetermined data by the switching of the cyclic color change,
    the color change is the one obtained by alternately emitting lights of two different colors, and
    the switching is to change at least one of the colors of the alternately emitted lights to another color.

* * * * *